(12) United States Patent
Babaei et al.

(10) Patent No.: US 10,873,934 B2
(45) Date of Patent: Dec. 22, 2020

(54) PRE-EMPTION INDICATION IN A WIRELESS DEVICE

(71) Applicants: Alireza Babaei, Fairfax, VA (US);
Esmael Dinan, Herndon, VA (US);
Hua Zhou, Herndon, VA (US);
Hyoungsuk Jeon, Centreville, VA (US);
Kyungmin Park, Herndon, VA (US)

(72) Inventors: Alireza Babaei, Fairfax, VA (US);
Esmael Dinan, Herndon, VA (US);
Hua Zhou, Herndon, VA (US);
Hyoungsuk Jeon, Centreville, VA (US);
Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 46 days.

(21) Appl. No.: 16/143,051

(22) Filed: Sep. 26, 2018

(65) Prior Publication Data
US 2019/0098612 A1 Mar. 28, 2019

Related U.S. Application Data

(60) Provisional application No. 62/564,771, filed on Sep. 28, 2017.

(51) Int. Cl.
*H04W 72/04* (2009.01)
*H04W 72/12* (2009.01)
*H04W 74/08* (2009.01)

(52) U.S. Cl.
CPC ..... *H04W 72/042* (2013.01); *H04W 72/0446* (2013.01); *H04W 72/0453* (2013.01); *H04W 72/1289* (2013.01); *H04W 74/0841* (2013.01)

(58) Field of Classification Search
CPC .......... H04W 72/042; H04W 72/1289; H04W 72/0453; H04W 72/0446; H04W 74/0841
See application file for complete search history.

(56) References Cited

U.S. PATENT DOCUMENTS

2018/0035332 A1* 2/2018 Agiwal ................. H04J 11/003
2018/0070341 A1* 3/2018 Islam ................... H04L 1/1887
(Continued)

OTHER PUBLICATIONS

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA);; Physical channels and modulation.
(Continued)

*Primary Examiner* — Hoang-Chuong Q Vu
(74) *Attorney, Agent, or Firm* — David Grossman; Kavon Nasabzadeh; Philip Smith

(57) ABSTRACT

A wireless device may receive a first downlink control information (DCI). The first DCI may indicate a first plurality of resources for one or more uplink transport blocks. A group common DCI may be received via a common control channel. The group common DCI may comprise a field indicating an uplink pre-emption indication. The uplink pre-emption indication may indicate a second plurality resources. One or more first resources may be punctured from the first plurality of resources. The one or more first resources may be overlapping resources of the first plurality of resources and the second plurality of resources. The one or more uplink transport blocks may be transmitted via remaining resources of the first plurality of resources after the puncturing.

20 Claims, 21 Drawing Sheets

(56) References Cited

U.S. PATENT DOCUMENTS

| | | | |
|---|---|---|---|
| 2018/0270792 A1* | 9/2018 | Park | H04W 76/27 |
| 2018/0278454 A1* | 9/2018 | Islam | H04L 1/0038 |
| 2019/0052432 A1* | 2/2019 | Islam | H04L 5/0094 |
| 2019/0074929 A1* | 3/2019 | Aiba | H04W 76/27 |
| 2019/0089499 A1* | 3/2019 | Nam | H04L 5/005 |
| 2019/0165984 A1* | 5/2019 | Shapin | H04W 72/044 |
| 2019/0268930 A1* | 8/2019 | Rudolf | H04W 72/14 |
| 2019/0281609 A1* | 9/2019 | Kowalski | H04W 72/1242 |
| 2019/0327757 A1* | 10/2019 | Oteri | H04L 5/0053 |
| 2020/0008216 A1* | 1/2020 | Iyer | H04W 72/1242 |
| 2020/0077470 A1* | 3/2020 | Xiong | H04L 1/1854 |
| 2020/0205173 A1* | 6/2020 | Frederiksen | H04L 1/18 |

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).
3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.211 V0.2.0 (Aug. 2017); Technical Specification; 3rd Generation Partnership Project; Technical Specification Group Radio Access Network; NR; Physical channels and modulation; (Release 15).
3GPP TS 38.212 V0.1.0 (Aug. 2017); Technical Specification; 3rd Generation Partnership Project; Technical Specification Group Radio Access Network; NR; Multiplexing and channel coding; (Release 15).
3GPP TS 38.214 V0.1.0 (Aug. 2017); Technical Specification; 3rd Generation Partnership Project; Technical Specification Group Radio Access Network; NR;Physical layer procedures for data (Release 15).
3GPP TS 38.321 V1.0.0 (Sep. 2017); Technical Specification; 3rd Generation Partnership Project; Technical Specification Group Radio Access Network; NR; Medium Access Control (MAC) protocol specification; (Release 15).
R1-1715409; 3GPP TSG RAN WG1 Ad Hoc Meeting;Nagoya, Japan, Sep. 18-21, 2017; ; Agenda Item:6.3.3.6; Source:Huawei, HiSilicon; Title:On pre-emption indication for DL multiplexing of URLLC and eMBB.
R1-1715491 UL multiplexing final Fujitsu; 3GPP TSG RAN WG1 Meeting NR#3; Nagoya, Japan, Sep. 18-21, 2017; ; Source: Fujitsu; Title: On eMBB and URLLC multiplexing for uplink; Agenda Item:6. 3.3. 6.
R1-1715550_Pause Resume_final; 3GPP TSG-RAN WG1 NR AH #3; Nagoya, Japan, Sep. 18-21, 2017 (Resubmission of R1-1711003); ; Agenda item:6.3.3.6; Source:Nokia, Nokia Shanghai Bell ; Title:Pause-Resume Scheduling for Low Latency Uplink Transmissions.
R1-1715561 About DL pre-emption indication; 3GPP TSG RAN1-NR#3; Nagoya, Japan, Sep. 18-21, 2017; Source: ZTE, Sanechips; Title: About DL pre-emption indication; Agenda item:6.3.3.6.
R1-1715568; 3GPP TSG RAN WG1 NR Ad Hoc Meeting; Nagoya, Japan, Sep. 18-21, 2017; ; Agenda Item:6.3.3.7; Source:Huawei, HiSilicon; Title:Consideration on subsequent transmission after pre-emption.
R1-1715646_Multiplexing data with different transmission durations; 3GPP TSG RAN WG1 Meeting NR#3; Nagoya, Japan, Sep. 18-21, 2017; ; Source:vivo; Title:Multiplexing data with different transmission durations; Agenda Item:6.3.3.6.
R1-1715691; 3GPP TSG RAN WG1 Meeting NR#3; Nagoya, Japan, Sep. 18-21, 2017; ; Source: Guangdong OPPO Mobile Telecom; Title:Multiplexing between slot-based and symbol-based transmissions and pre-emption indication; Agenda Item:6.3.3.6.
R1-1715711; 3GPP TSG RAN WG1 Meeting NR#3; Nagoya, Japan, Sep. 18-21, 2017; Source: NEC; Title: Discussion on DL pre-emption indication; Agenda Item:6.3.3.6; Document for: Discussion and Decision.
R1-1715829; 3GPP TSG RAN WG1 Meeting NR#3; Nagoya, Japan, Sep. 18-21, 2017; ; Source:CATT; Title:On multiplexing of data with different transmission durations; Agenda Item:6.3.
R1-1715890 Remaining issues on preemption indication for DL_vf; 3GPP TSG RAN WG1 Meeting NR#3; Nagoya, Japan, Sep. 18-21, 2017; Agenda Item:6.3.3.6; Source: LG Electronics; Title: Remaining issues on pre-emption indication for downlink; Document for:Discussion and decision.
R1-1716009—Indication of Preempted Resources in DL; 3GPP TSG RAN WG1 Meeting NR#3; Nagoya, Japan, Sep. 18-21, 2017; ; Agenda Item:6.3.3.6; Source:Samsung; Title:Indication of Preempted Resources in DL.
R1-1716063; 3GPP TSG RAN WG1 Meeting NR#3; Nagoya, Japan, Sep. 18-21, 2017; ; Agenda item:6.8; Source: Samsung; Title: On Modulation Scheme for URLLC with Pre-emption based Multiplexing in DL.
R1-1716191 ATT mini slots; 3GPP TSG RAN WG1 Meeting NR#3; Nagoya, Japan, Sep. 18-21, 2017; ; Agenda Item-6.3.3.6; Source:AT&T; Title:Scheduling Details for Mini-Slot based Transmissions.
R1-1716196 Multiplexing of UL eMBB and URLLC in NR; 3GPP TSG RAN WG1 Meeting AH_NR#3; Nagoya, Japan, Sep. 18-21, 2017; ; Agenda Item:6.3.3.6; Source:ASUSTeK; Title: Multiplexing of UL eMBB and URLLC in NR.
R1-1716202_remaining details on bandwidth part operation in NR; 3GPP TSG RAN WG1 Meeting NR#3; Nagoya, Japan, Sep. 18-21, 2017; Agenda Item: 6.3.4; Source: MediaTek Inc.; Title: Remaining Details on Bandwidth Part Operation in NR; Document for: Discussion.
R1-1716250; 3GPP TSG RAN WG1 Meeting NR#3; Nagoya, Japan, Sep. 18-21, 2017.
R1-1716251—Rel-15 NR—Remaining issues on pre-emption indicator v03; 3GPP TSG RAN WG1 Meeting NR#3; Nagoya, Japan, Sep. 18-21, 2017; Agenda Item:6.3.3.6; Source: Sony ; Title:Remaining issues on pre-emption indicator; Document for:Discussion / decision.
R1-1716325 Intel—Preemption; 3GPP TSG RAN WG1 Meeting NR#3; Nagoya, Japan, Sep. 18-21, 2017; ; Source:Intel Corporation; Title:Multiplexing of different data channel durations; Agenda item:6.3.3.6.
R1-1716433 Slot Aggregation; 3GPP TSG-RAN WG1 NR AdHoc #3; Sep. 18-21, 2017; Nagoya, Japan;; ; Agenda item:6.3.3.6.
R1-1716434 URLLC DL pre-emption and UL suspension indication channel design; 3GPP TSG-RAN WG1 NR Ad-Hoc #3; Sep. 18-21, 2017; Nagoya, Japan; ; Agenda item:6.3.3.7; Source: Qualcomm Incorporated.
R1-1716484 On UL multiplexing of data with different transmission durations; 3GPP TSG RAN WG1 Meeting NR#3; Nagoya, Japan, Sep. 18-21, 2017; ; Agenda Item:6.3.3.6; Source:InterDigital Inc.; Title:On UL multiplexing of data with different transmission durations.
R1-1716531; 3GPP TSG RAN WG1 NR Ad-Hoc#3; Nagoya, Japan, Sep. 18-21, 2017; ; Source:NTT DOCOMO, Inc.; Title:Multiplexing data with different transmission durations ; Agenda Item:6.3.3.6.
R1-1716573; 3GPP TSG RAN WG1 Meeting NR#3; Nagoya, Japan, Sep. 18-21, 2017; ; Agenda Item:6.3.3.6; Source: KT Corp.; Title:Remaining on preemption indication for DL.

(56) References Cited

OTHER PUBLICATIONS

R1-1716599; 3GPP TSG RAN1 WG1 Meeting NR#3; Nagoya, Japan, Sep. 18-21, 2017; ; ; Agenda Item:6.3.3.6; Source:Ericsson.
R1-1716617_On remaining_aspects_for_preemption-based_data_multiplexing; 3GPP TSG RAN WG1 Meeting NR#3R1-1716617 Nagoya, Japan, Sep. 18-21, 2017; ; Agenda item:6.3.3.6; Source: Sequans Communications; Title: On remaining aspects for preemption-based data multiplexing.
R1-1716636; 3GPP TSG RAN WG1 Meeting NR#3; Nagoya, Japan, Sep. 18-21, 2017; ; Source:WILUS Inc.; Title:Discussion on UE behavior by pre-emption indication; Agenda item:6.3.3.6.
R1-1716646; 3GPP TSG RAN WG1 Meeting NR#3R1-1716646 Nagoya, Japan, Sep. 18-21, 2017; ; Agenda Item:6.3.3.6; Source:KDDI; Title:Discussion of pre-emption indication design for downlink.
R1-1716652; 3GPP TSG RAN WG1 Meeting NR#3R1-1716652 Nagoya, Japan, Sep. 18-21, 2017; ; Source : CATR; Title : Discussion on the design of DL preemption indication; Agenda Item: 6.3.3.6.
R1-1716830 CA Offline_v1; 3GPP TSG RAN WG1 Meeting NR#3 R1-1716830 Nagoya, Japan, Sep. 18-25, 2017; Agenda item:6.3.4; Source: Samsung ; Title: Open Issues for CA ; Document for:Discussion and Decision.
R1-1716911_summary of offline discussion on premption indication_ v2.3; 3GPP TSG RAN WG1 Meeting NR#3R1-1716911 Nagoya, Japan, Sep. 18-21, 2017; Agenda Item:6.3.3.6; Source: vivo; Title: Summary of Offline Discussion on preemption indication; Document for: Discussion and decision.
R2-1707748 38300-060; 3GPP TS 38.300 V0.6.0 (Aug. 2017) Technical Specification; 3rd Generation Partnership Project;; Technical Specification Group Radio Access Network;; NR; NR and NG-RAN Overall Description;; Stage 2.
R2-1708468 38331-005; 3GPP TS 38.331 V0.0.5 (Aug. 2017) Technical Specification; 3rd Generation Partnership Project;; Technical Specification Group Radio Access Network;; NR;; Radio Resource Control (RRC).

* cited by examiner

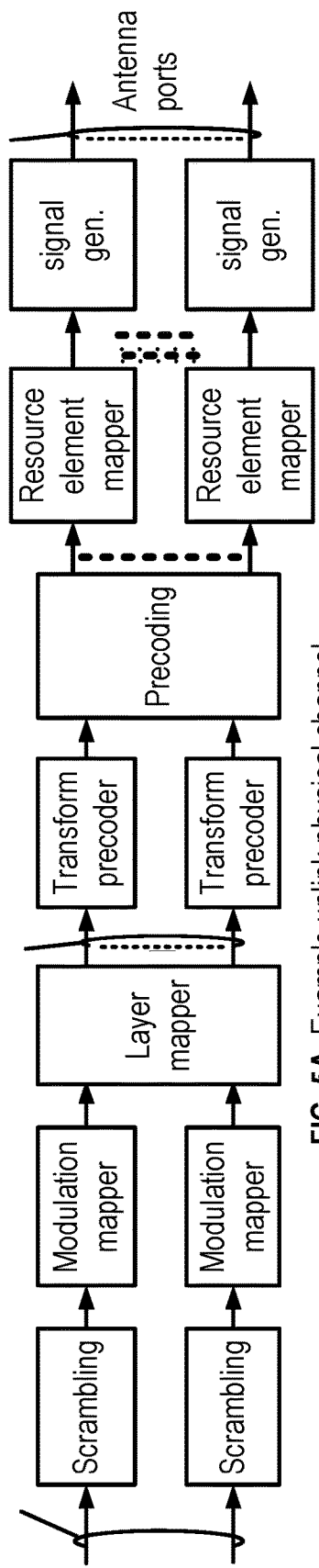
FIG. 5A Example uplink physical channel
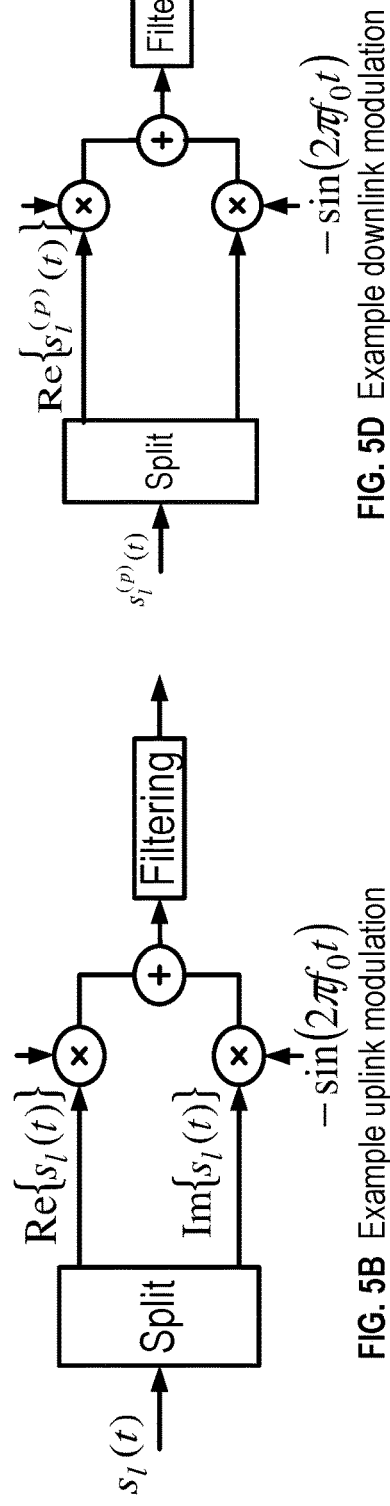
FIG. 5B Example uplink modulation
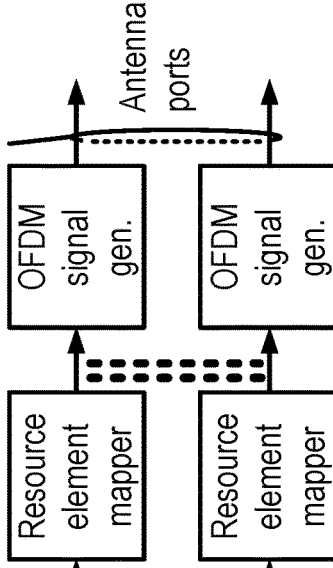
FIG. 5D Example downlink modulation
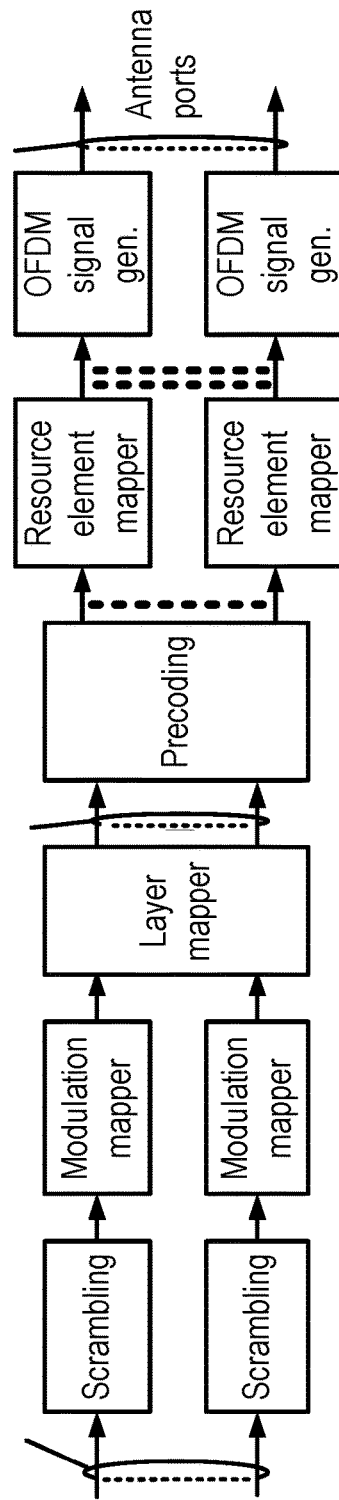
FIG. 5C Example downlink physical channel Dual-Connectivity- two MAC entities at UE side

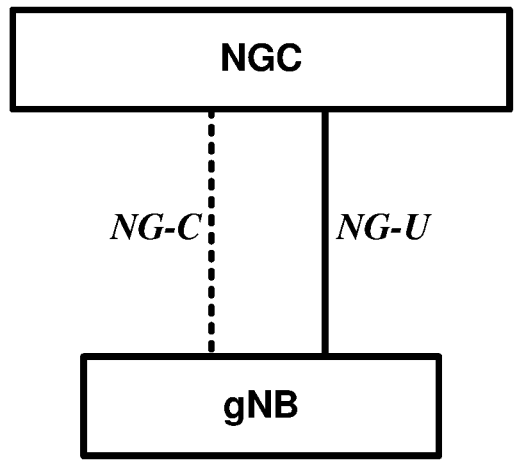
FIG. 10A  gNB connected to NGC
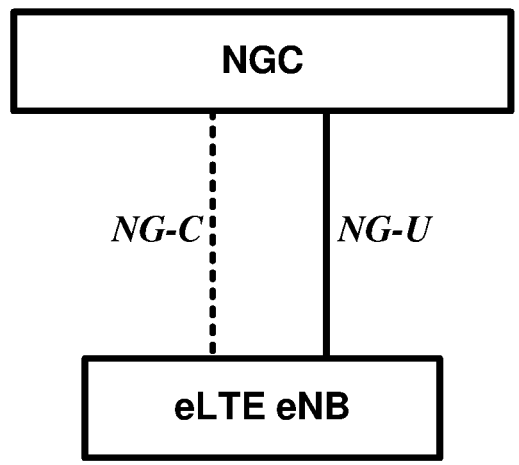
FIG. 10B  eLTE eNB connected to NGC

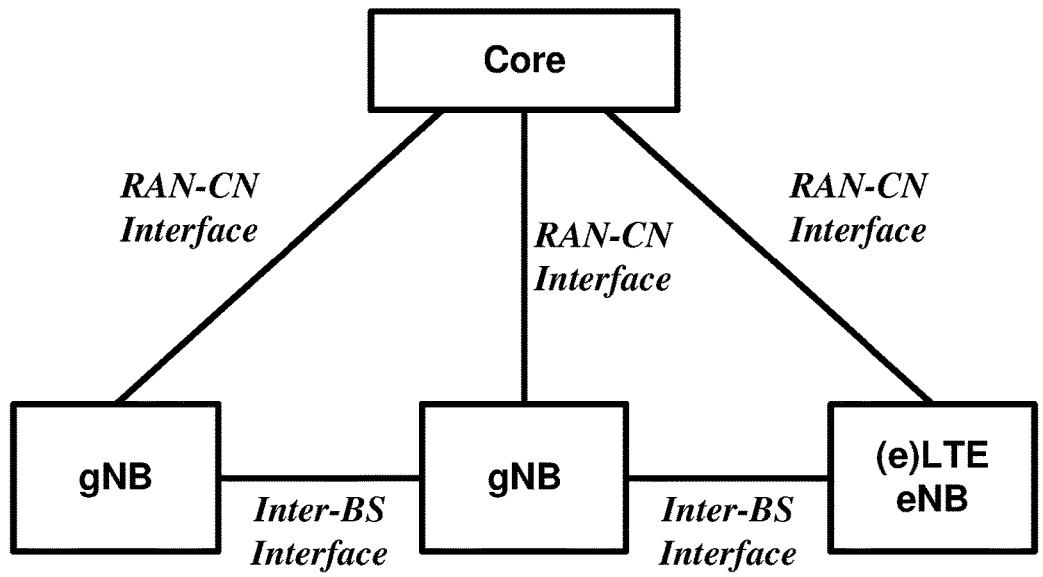
FIG. 13A  Non-centralized deployment
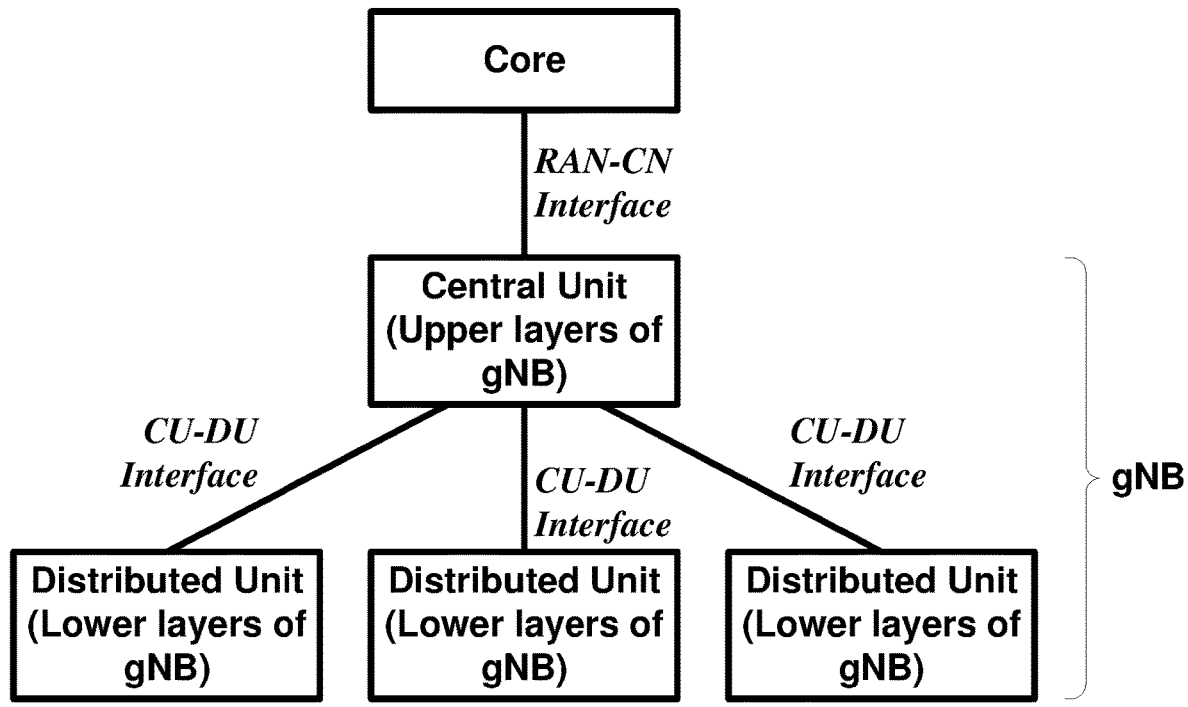
FIG. 13B  Centralized deployment

PRE-EMPTION INDICATION IN A WIRELESS DEVICE

This application claims the benefit of U.S. Provisional Application No. 62/564,771, filed Sep. 28, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 13A and FIG. 13B are example diagrams for gNB deployment scenarios as per an aspect of an embodiment of the present invention.

DETAILED DESCRIPTION OF EMBODIMENTS

Figure 1:
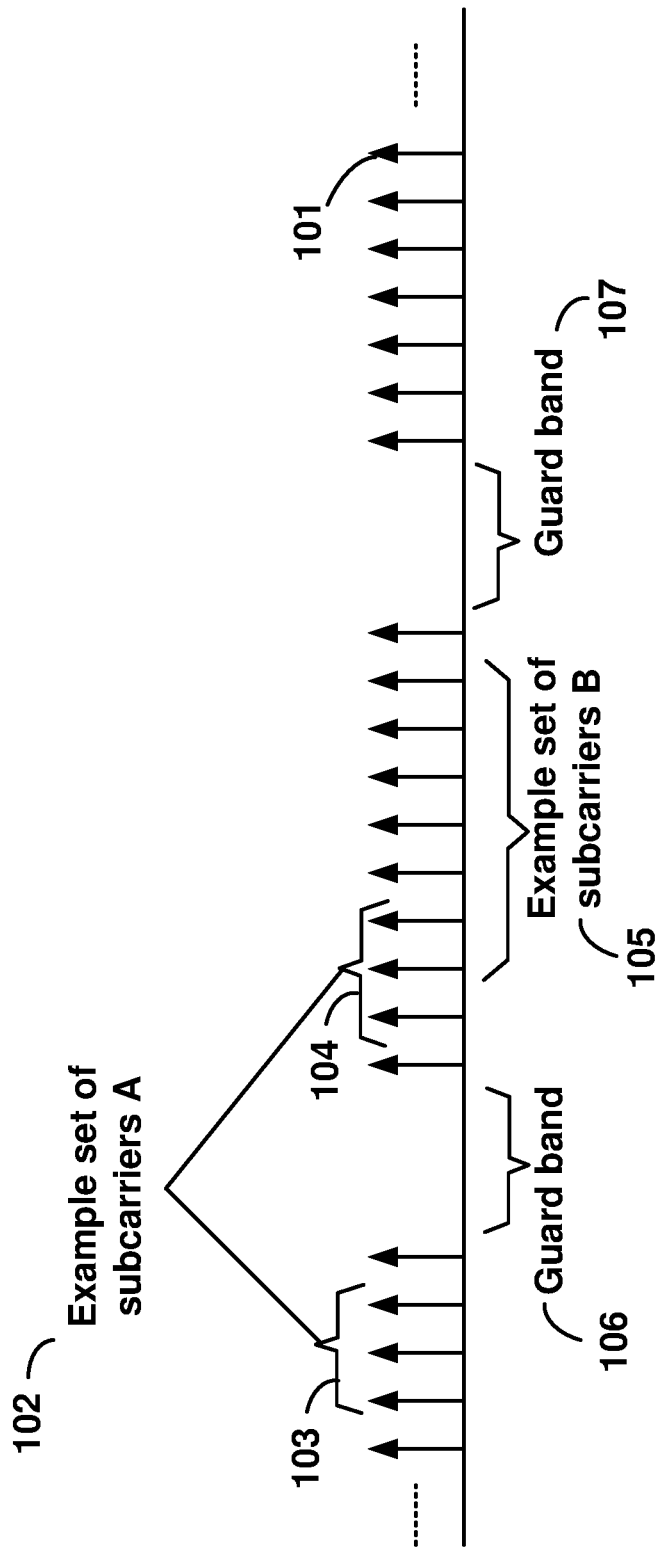
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to pre-emption indication in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-Ccontrol plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
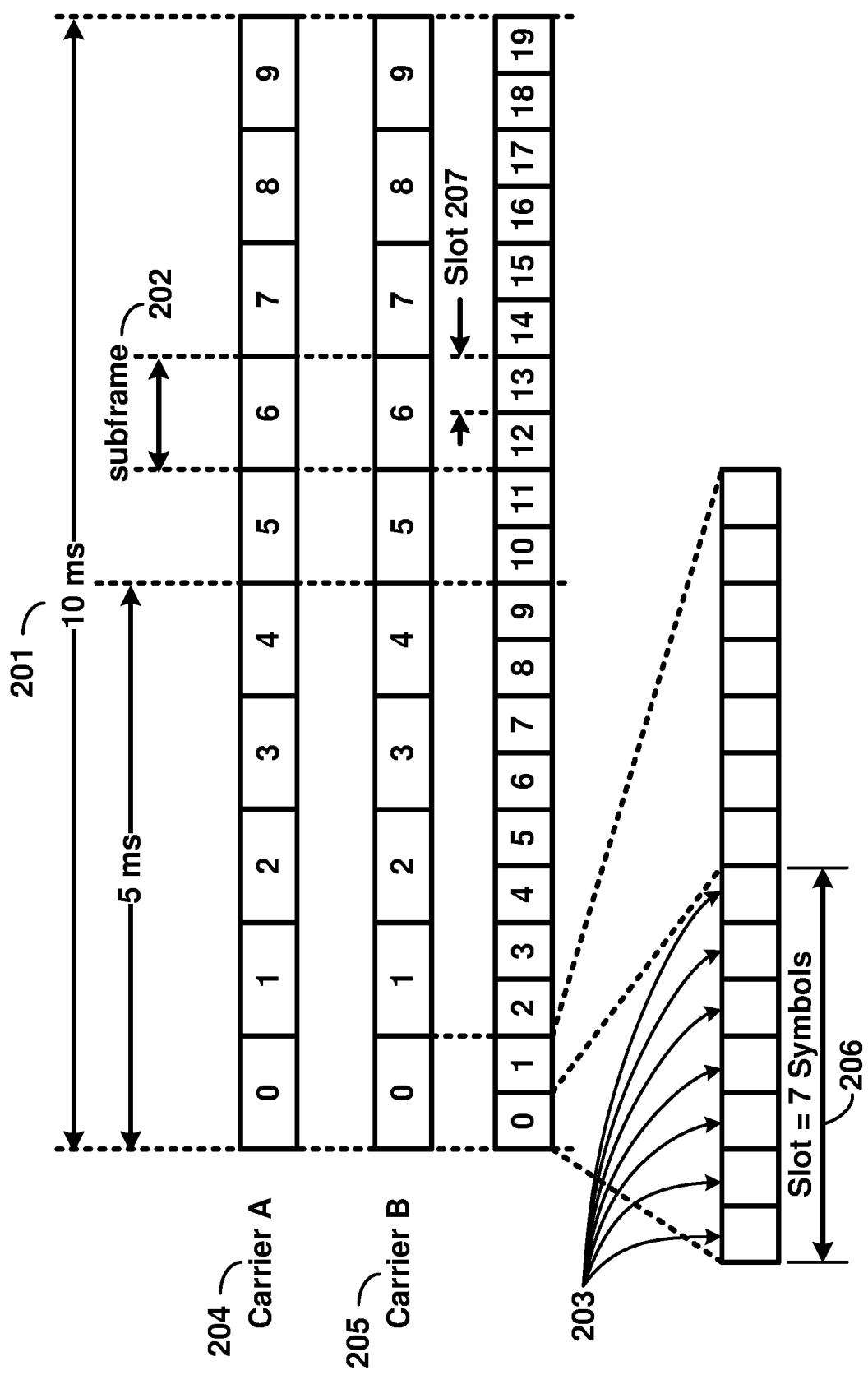
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
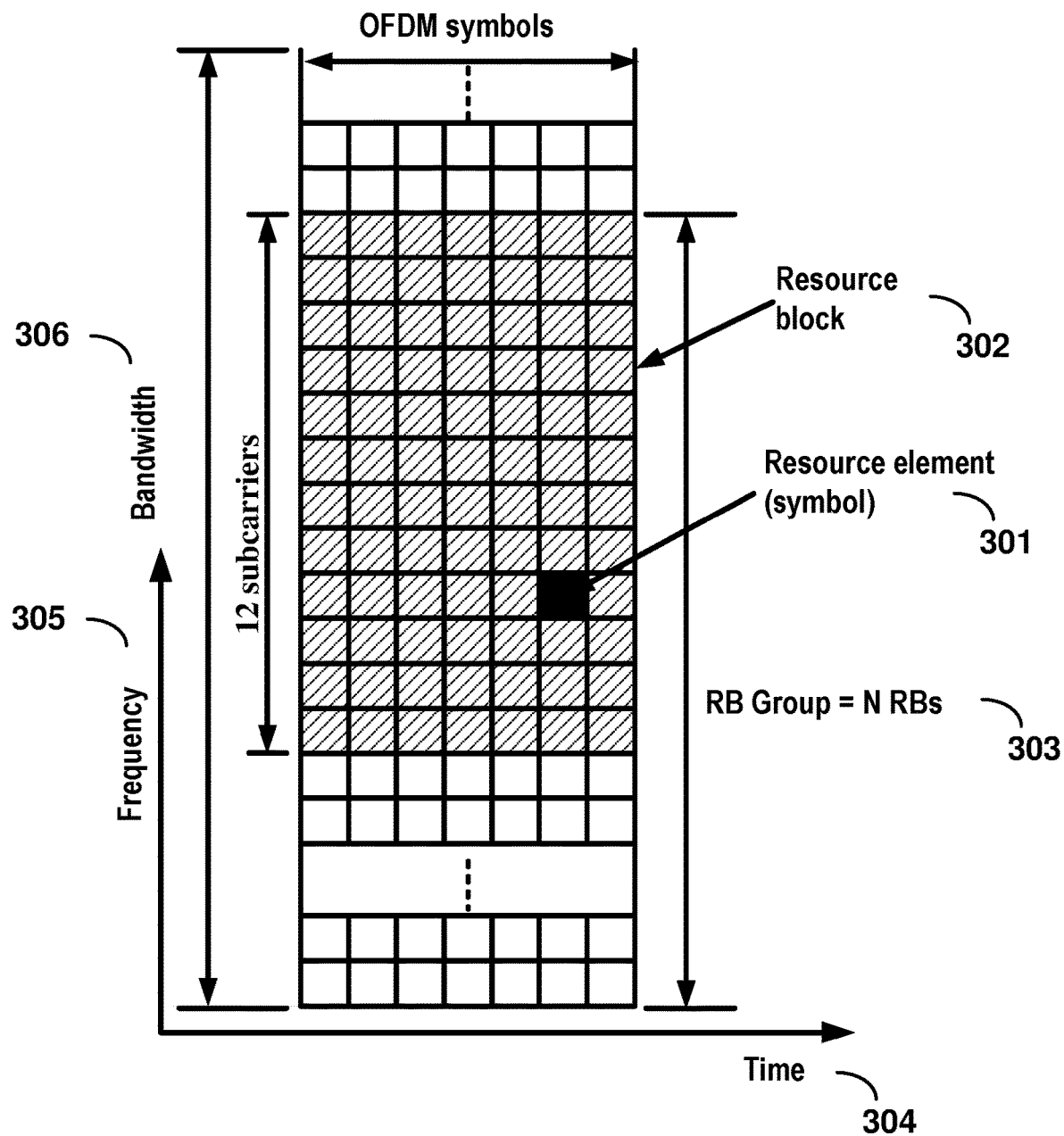
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
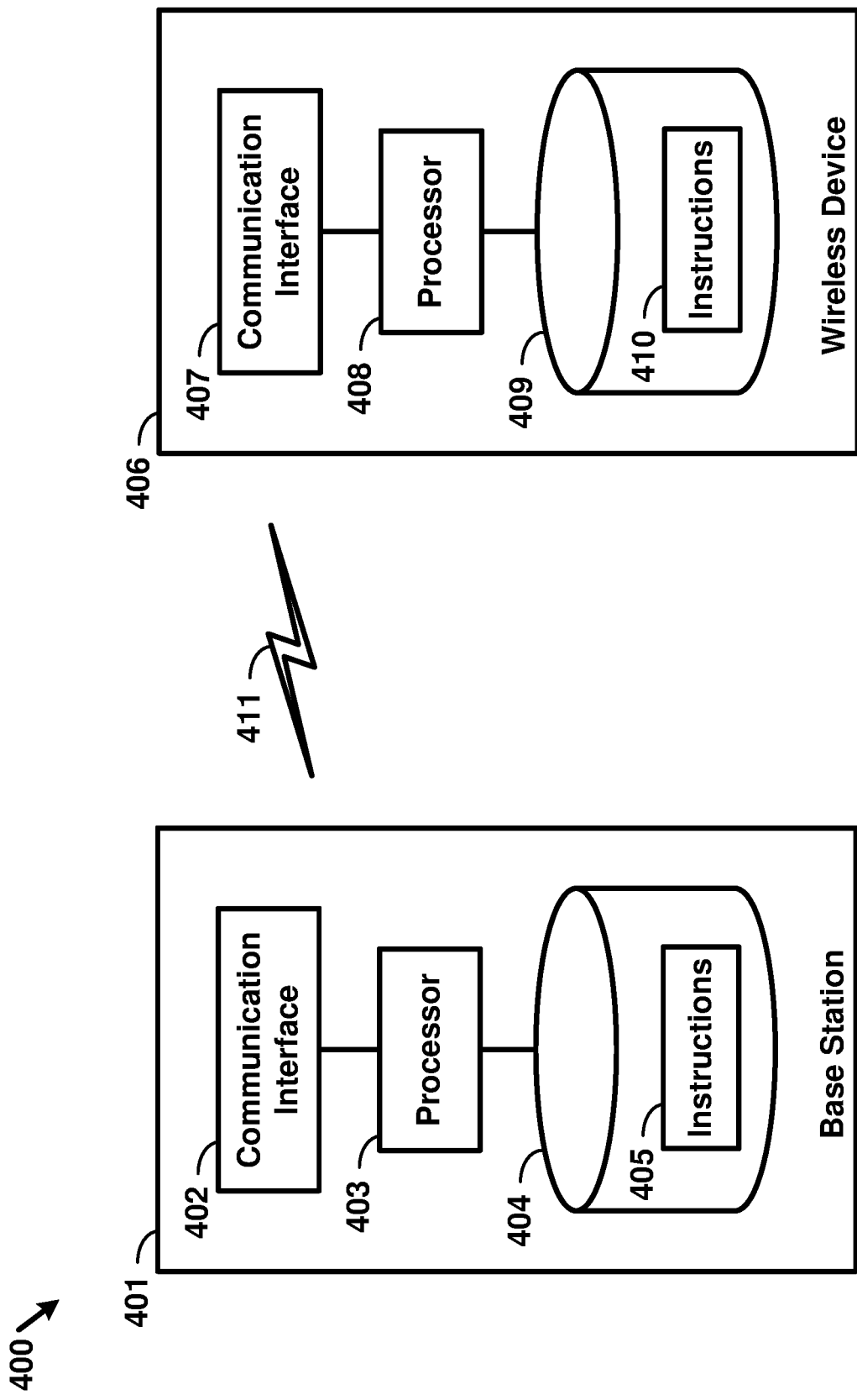
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
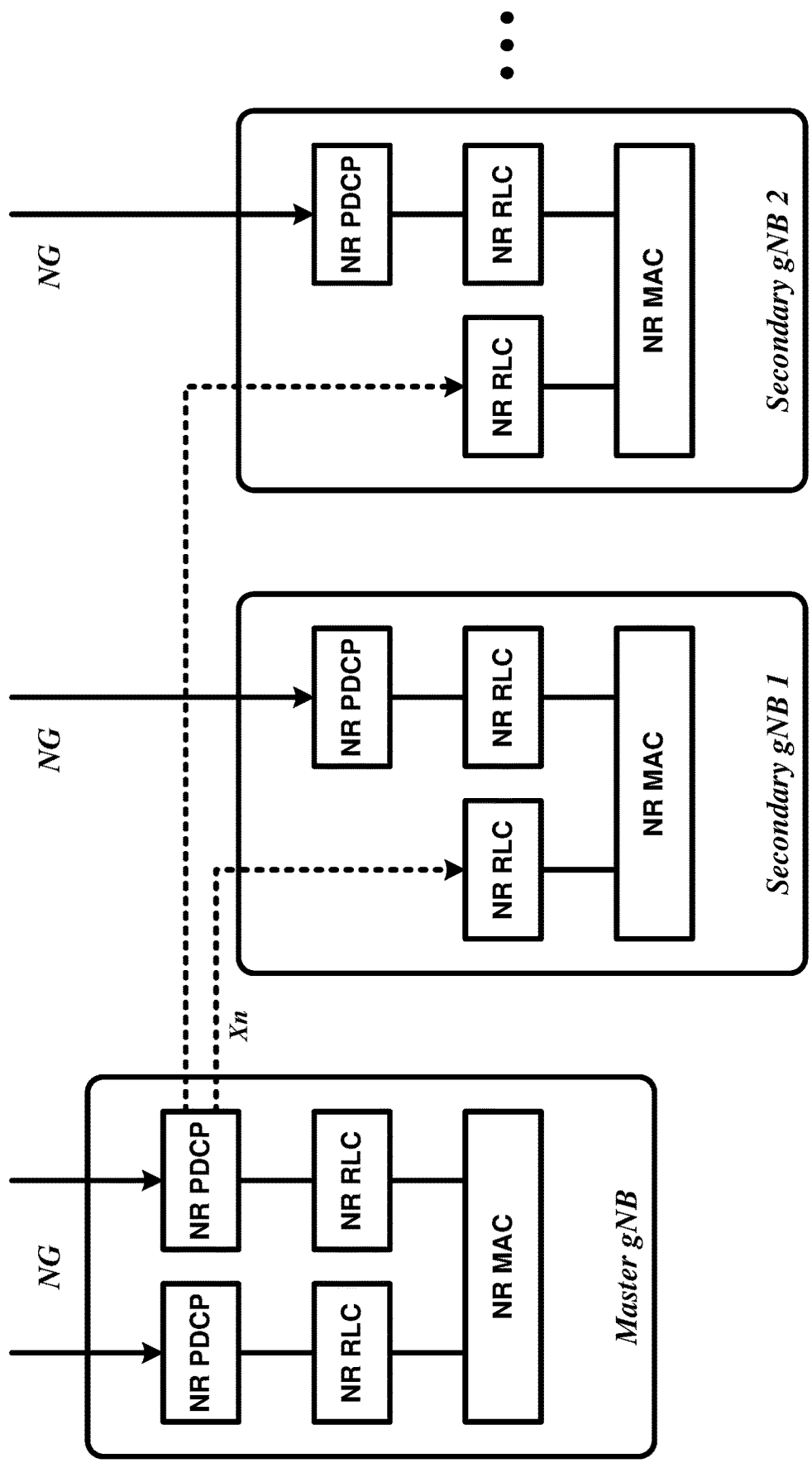
FIG. 6 is an example diagram for a protocol structure with multi-connectivity as per an aspect of an embodiment of the present invention.
Figure 7:
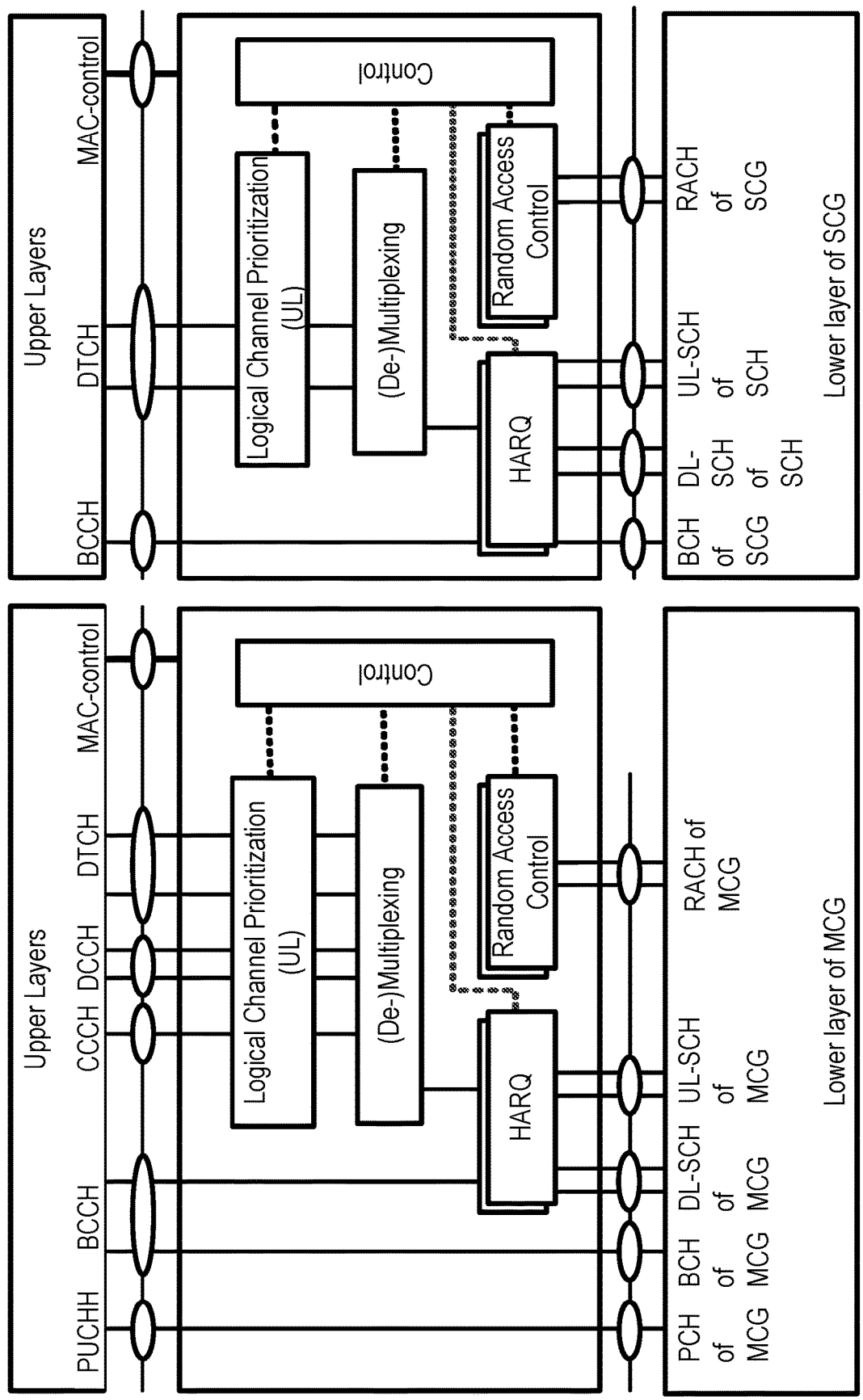
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE;

upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
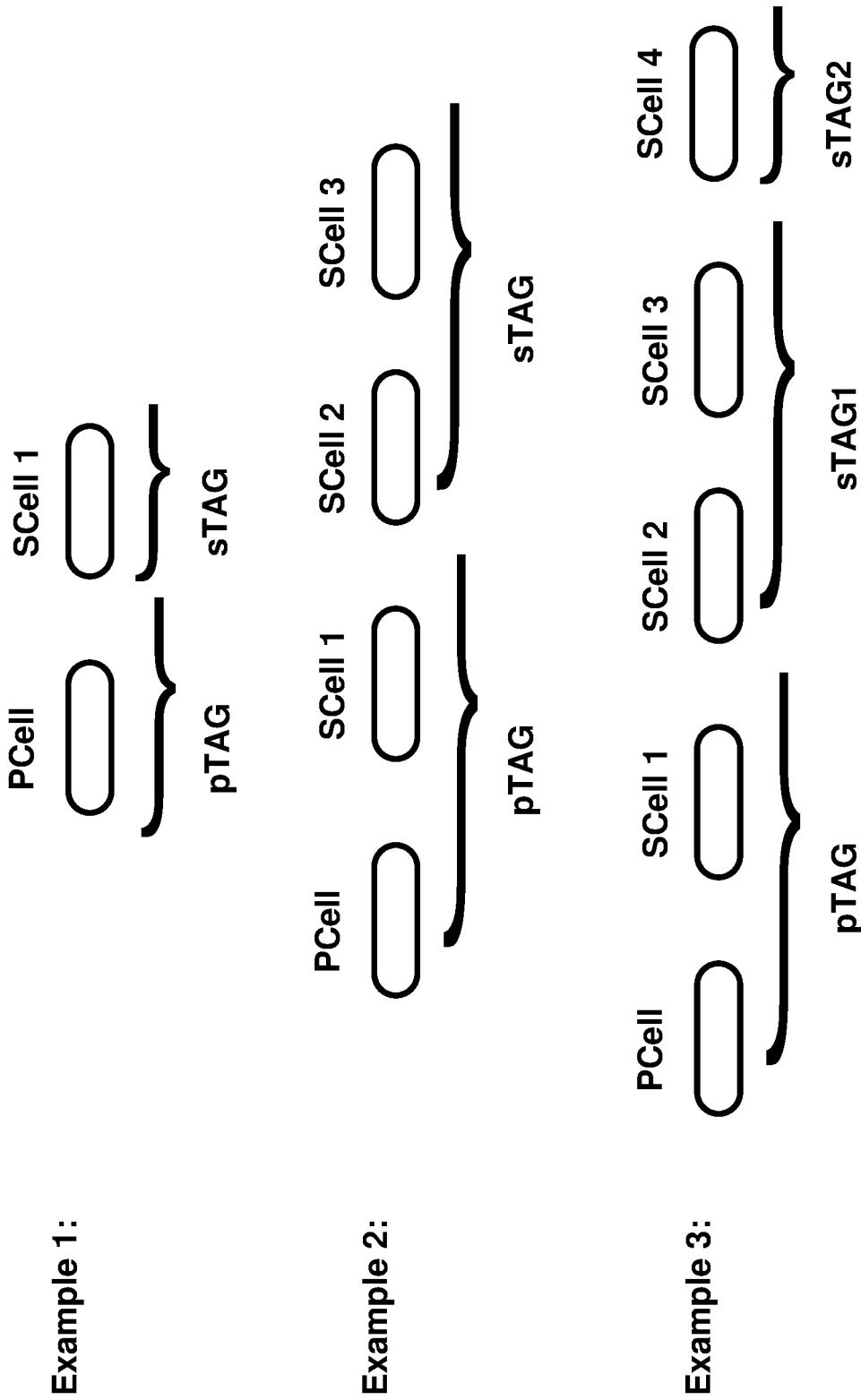
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
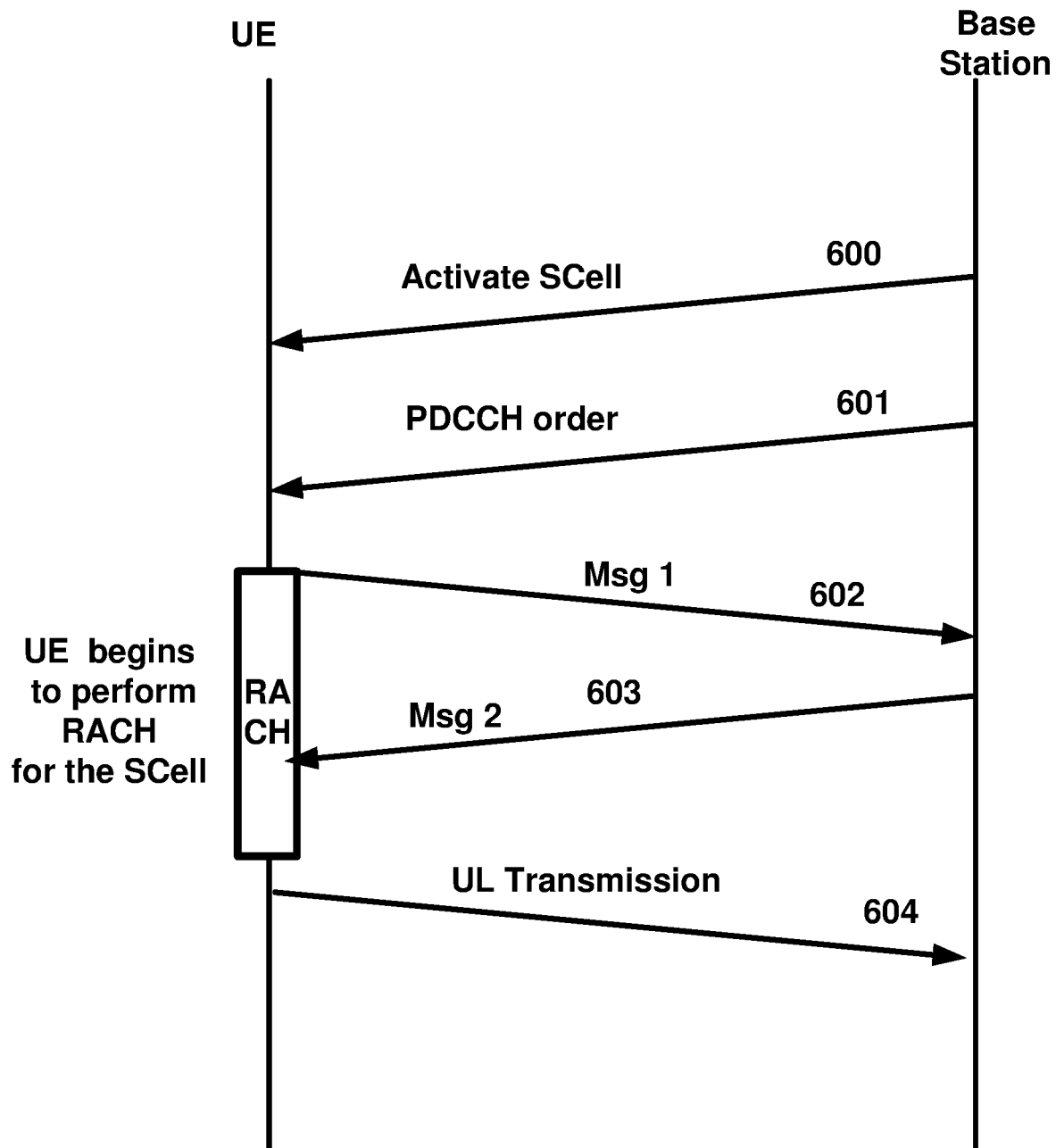
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The time-AlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

Figure 11A:
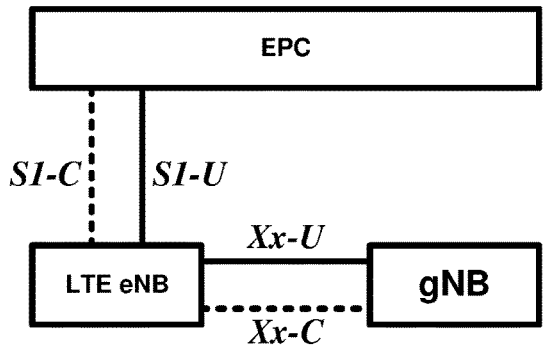
FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.
Figure 11B:
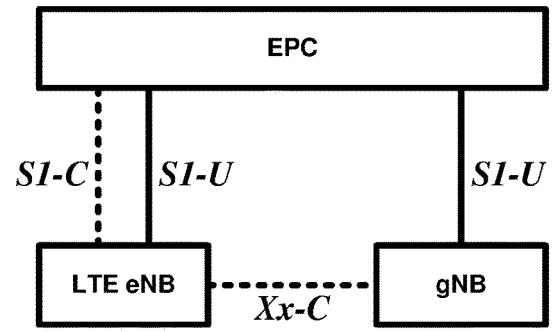

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

Figure 11C:
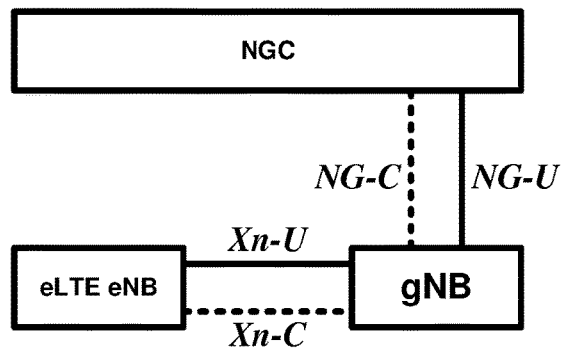
Figure 11D:
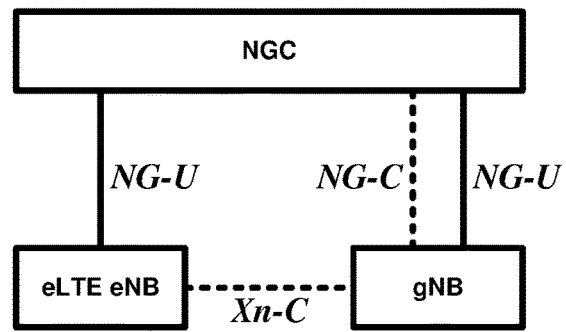

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

Figure 11E:
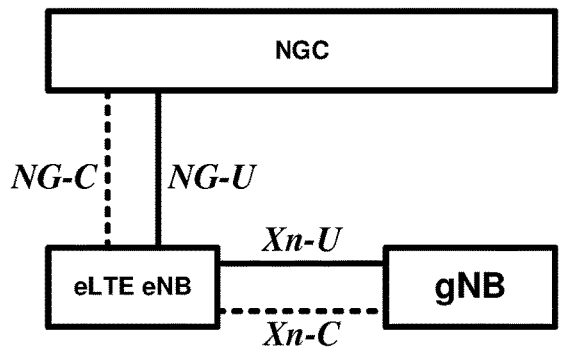
Figure 11F:
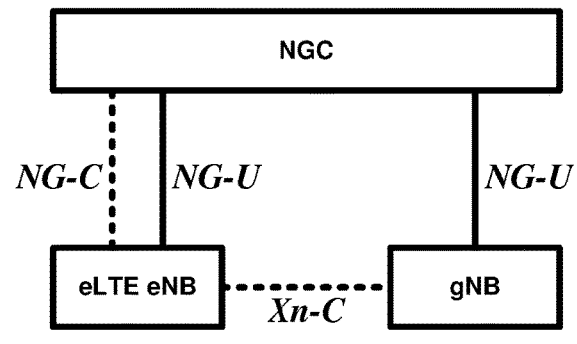

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
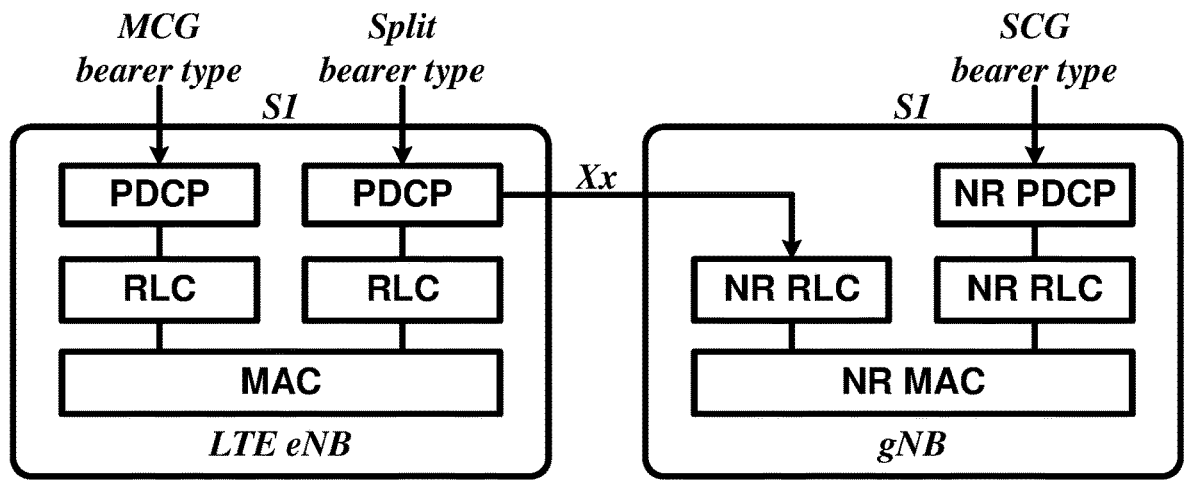
FIG. 12A, FIG. 12B, and FIG. 12C are example diagrams for radio protocol structures of tight interworking bearers as per an aspect of an embodiment of the present invention.
Figure 12B:
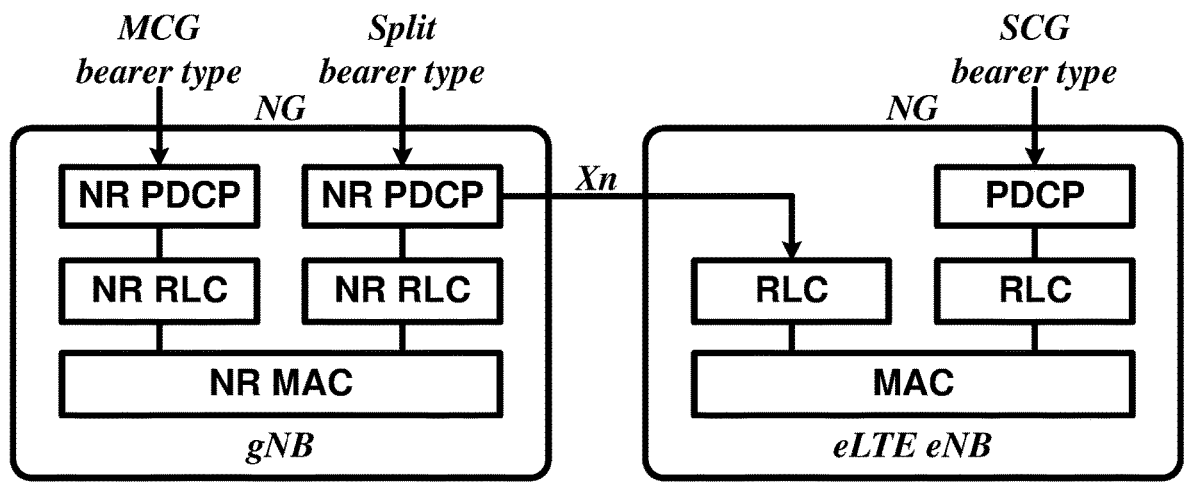
Figure 12C:
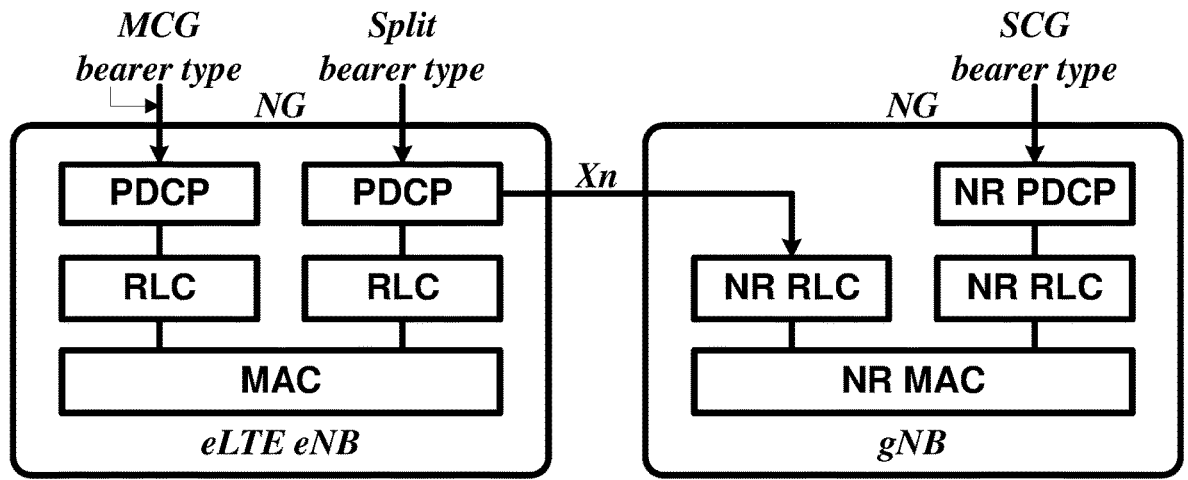

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
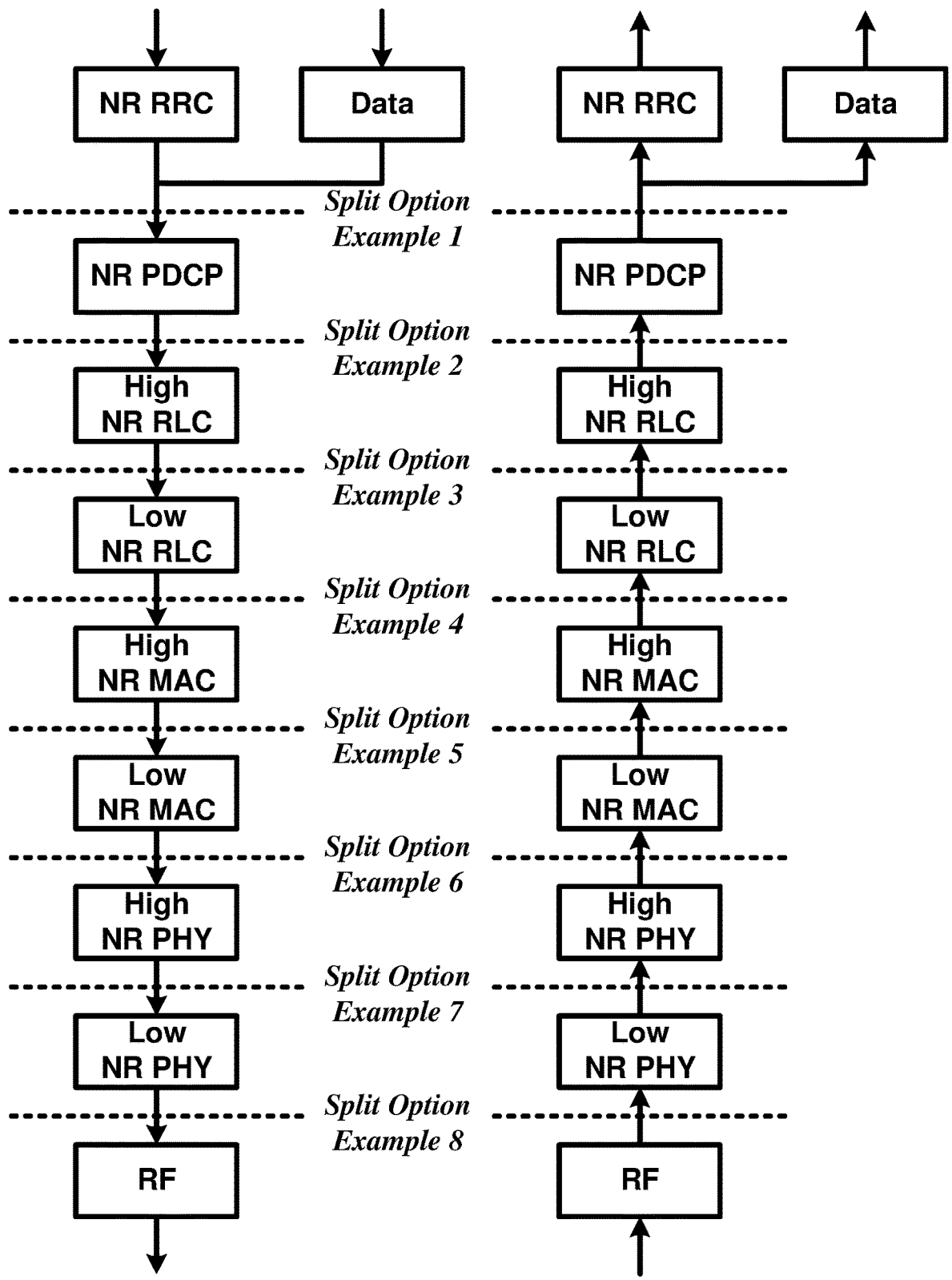
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an examle, data from a packet data convergence protocol (PDCP) entity corresponding to a bearer may be dupplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifer n, 0≤n≤N (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifer(s) and logical channel group identifer(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, DRX operation may be used by a wireless device to improve UE battery lifetime. In an example, in DRX, UE may discontinuously monitor downlink control channel, e.g., PDCCH/EPDCCH. In an example, the base station may configure DRX with a set of DRX parameters, e.g., using RRC configuration. The DRX parameters may be selected based on the application type such that power and resource savings are maximized. In an example, in response to DRX being configured/activated, there may be an extended delay in receiving data as, the UE may be in DRX Sleep/Off state at the time of data arrival at the base station and the base station would need to wait until the UE transitions to the DRX ON state. The base station may select the DRX parameters such that the packet delay is minimized and power saving is maximized.

In an example, during a DRX mode, the UE may power down most of its circuitry when there are no packets to be received. During this time UE listens to the downlink (DL) occasionally which is called DRX Active state whereas the time during which UE doesn't listen PDCCH is called DRX Sleep state.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to maximize resource utilization.

An example DRX configuration information element is shown below. The time granularity for legacy DRX timers may be in terms PDCCH subframes (e.g., indicated as psf in the DRX configurations) in legacy DRX procedures. Example embodiments may enhance the DRX configuration for determining time granularity of DRX timers for example, based on a numerology and/or TTI.

```
DRX-Config ::=              CHOICE {
    release                 NULL,
    setup                   SEQUENCE {
        onDurationTimer             ENUMERATED {psf1, psf2, psf3, psf4,
psf5, psf6, psf8, psf10, psf20, psf30, psf40, psf50, psf60, psf80, psf100, psf200},
        drx-InactivityTimer         ENUMERATED {psf1, psf2, psf3, psf4, psf5,
psf6, psf8, psf10, psf20, psf30, psf40, psf50, psf60, psf80, psf100, psf200, psf300,
psf500, psf750, psf1280, psf1920, psf2560, psf0-v1020, spare9, spare8, spare7, spare6,
```

```
spare5, spare4, spare3, spare2, spare1 },
    drx-RetransmissionTimer       ENUMERATED {psf1, psf2, psf4, psf6,
psf8, psf16, psf24, psf33},
    longDRX-CycleStartOffset  CHOICE {
        sf10              INTEGER(0..9),
        f20               INTEGER(0..19),
        sf32              INTEGER(0..31),
        sf40              INTEGER(0..39),
        sf64              INTEGER(0..63),
        sf80              INTEGER(0..79),
        sf128             INTEGER(0..127),
        sf160             INTEGER(0..159),
        sf256             INTEGER(0..255),
        sf320             INTEGER(0..319),
        sf512             INTEGER(0..511),
        sf640             INTEGER(0..639),
        sf1024            INTEGER(0..1023),
        sf1280            INTEGER(0..1279),
        sf2048            INTEGER(0..2047),
        sf2560            INTEGER(0..2559)
    },
    shortDRX              SEQUENCE {
        shortDRX-Cycle            ENUMERATED {sf2, sf5, sf8, sf10,
sf16, sf20, sf32, sf40, sf64, sf80, sf128, sf160, sf256, sf320, sf512, sf640},
        drxShortCycleTimer        INTEGER (1..16)
    } OPTIONAL                                              -- Need OR
    }
}
```

In an example, the MAC entity may be configured by RRC with a discontinuous reception (DRX) functionality that controls the UE's downlink control channel (e.g., PDCCH) monitoring activity for a plurality of RNTIs for the MAC entity, e.g., C-RNTI and/or TPC-PUCCH-RNTI and/or TPC-PUSCH-RNTI and/or Semi-Persistent Scheduling C-RNTI (if configured) and/or eIMTA-RNTI (if configured) and/or SL-RNTI (if configured) and/or SL-V-RNTI (if configured) and/or CC-RNTI (if configured) and/or and SRS-TPC-RNTI (if configured). In an example, in response to being in RRC_CONNECTED, if DRX is configured, the MAC entity may monitor the PDCCH discontinuously using the DRX operation; otherwise the MAC entity may monitor the PDCCH continuously. RRC may control DRX operation by configuring a plurality of timers, e.g., onDurationTimer and/or drx-InactivityTimer and/or drx-RetransmissionTimer (e.g., one per DL HARQ process except for the broadcast process) and/or drx-ULRetransmissionTimer (one per asynchronous UL HARQ process) and/or the longDRX-Cycle and/or the value of the drxStartOffset and/or optionally the drxShortCycleTimer and/or shortDRX-Cycle. In an example, a HARQ RTT timer per DL HARQ process (except for the broadcast process) and/or UL HARQ RTT Timer per asynchronous UL HARQ process may be defined.

In an example, in response to a DRX cycle being configured, the Active Time may include includes the time while onDurationTimer or drx-InactivityTimer or drx-Retransmission Timer or drx-ULRetransmissionTimer or mac-ContentionResolutionTimer is running.

In an example, drx-Inactivity-Timer may specify a time duration for which the UE may be Active after successfully decoding a PDCCH indicating a new transmission (UL or DL or SL). In an example, this timer may be restarted upon receiving PDCCH for a new transmission (UL or DL or SL). In an example, the UE may transition to a DRX mode in response to the expiry of this timer.

In an example, shortDRX-Cycle may be a first type of DRX cycle (e.g., if configured) that needs to be followed when UE enters DRX mode. In an example, this IE indicates the length of the short cycle.

In an example, drxShortCycleTimer may be expressed as multiples of shortDRX-Cycle. The timer may indicate the number of initial DRX cycles to follow the short DRX cycle before entering the long DRX cycle.

In an example, longDRX-CycleStartOffset may define long DRX cycle length and/or the DRX offset. DRX offset may be used to calculate the start of DRX cycle.

In an example, onDurationTimer may specify the time duration at the beginning of a DRX Cycle (e.g., DRX ON). In an example, onDurationTimer may indicate the time duration before entering the power saving mode (DRX OFF).

In an example, HARQ RTT Timer may specify a minimum duration from the time new transmission is received and before the UE may expect a retransmission of a same packet. In an example, this timer may be fixed and may not be configured by RRC.

In an example, drx-RetransmissionTimer may indicate a maximum duration for which UE may be monitoring PDCCH when a retransmission from the eNodeB is expected by the UE.

In an example, in response to a DRX cycle being configured, the Active Time may include includes the time while a Scheduling Request is sent on PUCCH and is pending.

In an example, in response to a DRX cycle being configured, the Active Time may include includes the time while an uplink grant for a pending HARQ retransmission can occur and there is data in the corresponding HARQ buffer for synchronous HARQ process.

In an example, in response to a DRX cycle being configured, the Active Time may include includes the time while a PDCCH indicating a new transmission addressed to the C-RNTI of the MAC entity has not been received after successful reception of a Random Access Response for the preamble not selected by the MAC entity.

In an example, DRX may be configured for a wireless device. The HARQ RTT Timer may expire in a subframe and the data of the corresponding HARQ process may not be successfully decoded. The MAC entity may start the drx-RetransmissionTimer for the corresponding HARQ process.

In an example, DRX may be configured for a wireless device. An UL HARQ RTT Timer may expire in a subframe. The MAC entity may start the drx-ULRetransmissionTimer for the corresponding HARQ process.

In an example, DRX may be configured for a wireless device. A DRX Command MAC control element or a Long DRX Command MAC control element may be received. The MAC entity may stop onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drxShortCycleTimer and may use Short DRX Cycle. Otherwise, the MAC entity may use the Long DRX cycle.

In an example, DRX may be configured for a wireless device. In an example, drxShortCycleTimer may expire in a subframe. The MAC entity may use the Long DRX cycle.

In an example, DRX may be configured for a wireless device. In an example, a Long DRX Command MAC control element may be received. The MAC entity may stop drxShortCycleTimer and may use the Long DRX cycle.

In an example, DRX may be configured for a wireless device. In an example, if the Short DRX Cycle is used and [(SFN*10)+subframe number]modulo(shortDRX-Cycle)=(drxStartOffset)modulo(shortDRX-Cycle).

In an example, DRX may be configured for a wireless device. In an example, if the Long DRX Cycle is used and [(SFN*10)+subframe number]modulo (longDRX-Cycle)=drxStartOffset. The wireless device may start onDurationTimer.

In an example, DRX may be configured for a wireless device. In an example, during the Active Time, for a PDCCH-subframe, the subframe may not be required for uplink transmission for half-duplex FDD UE operation. In an example, the subframe may not be a half-duplex guard subframe. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE capable of simultaneous reception and transmission in the aggregated cells, the subframe may be a downlink subframe indicated by a valid eIMTA L1 signaling for at least one serving cell not configured with schedulingCellId. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE not capable of simultaneous reception and transmission in the aggregated cells, the subframe may be a downlink subframe indicated by a valid eIMTA L1 signaling for the SpCell. In an example, the subframe may not be part of a configured measurement gap. In an example, the subframe may not be part of a configured Sidelink Discovery Gap for Reception. The wireless device may monitor the PDCCH. In an example, if the PDCCH indicates a DL transmission or if a DL assignment has been configured for this subframe, the wireless device may start the HARQ RTT Timer for the corresponding HARQ process. The wireless device may stop the drx-RetransmissionTimer for the corresponding HARQ process. In an example, if the PDCCH indicates an UL transmission for an asynchronous HARQ process or if an UL grant has been configured for an asynchronous HARQ process for this subframe, the wireless device may start the UL HARQ RTT Timer for the corresponding HARQ process in the subframe containing the last repetition of the corresponding PUSCH transmission. The wireless device may stop the drx-ULRetransmissionTimer for the corresponding HARQ process. In an example, if the PDCCH indicates a new transmission (DL, UL or SL), the wireless device may start or restart drx-InactivityTimer.

In an example embodiment, one or more of the DRX timers (e.g., HARQ RTT timer and/or uplink HARQ RTT timer) may have dynamic values. In an example, a value of a DRX timer may be indicated dynamically, e.g., based on one or more indication in DCI and/or in in combination of DCI and RRC (e.g., RRC may configure a plurality of values and DCI may indicate one or more of the plurality of values, e.g., by indicating an index).

In an example embodiment, a base station may pre-empt one or more scheduled downlink and/or uplink transmissions to schedule a first wireless device for URLLC transmission. Uplink and/or downlink transmission of one or more wireless devices may be impacted die to this pre-emption. In an example, the base station may indicate the pre-empted resources by transmitting a pre-emption indication. In an example, pre-emption indication may be explicitly transmitted before an A/N feedback. In an example, the A/N feedback timing may be indicated in the DCI that scheduled the impacted transmission. In an example, the UE may be configured to receive a downlink control signaling that includes the pre-emption indication. In an example, the pre-emption indication may be transmitted after the A/N feedback.

In an example, For DL CBG-based (re)transmission, following information may be configured to be included in the same DCI: which CBG(s) is/are (re)transmitted, which CBG(s) is/are handled differently for soft-buffer/HARQ combining. In an example, part/whole of soft-buffer of indicated CBG(s) may be flushed. In an example, the flushing behavior may be configurable. In an example, pre-emption indication may indicate which DL physical resources has been preempted. In an example, the pre-emption indication may be transmitted using a PDCCH and/or group common PDCCH. In an example, the pre-emption indication may not be included in the DCI that schedules the (re)transmission of the data transmission.

In an example, pre-empted resource(s) within a certain time/frequency region (e.g., reference downlink resource) within the periodicity to monitor group common DCI for pre-emption indication, may be indicated by a group common DCI carrying the preemption indication. In an example, the frequency region of the reference downlink resource may be configured semi-statically, e.g., using explicit RRC signaling or may be implicitly derived by other RRC signaling. In an example, the time region of the reference downlink resource may be configured semi-statically, e.g., using explicit RRC signaling or may be implicitly derived by other RRC signaling. The frequency granularity of pre-emption indication may be configured to be y RBs within the reference downlink resource for the given numerology, e.g., using explicit signaling or implicitly derived by other RRC signaling. The y RBs may correspond to the whole frequency region of the downlink reference resource. The time granularity of pre-emption indication may be configured to be x symbols within the reference downlink resource for the given numerology, e.g., using explicit signaling or implicitly derived by other RRC signaling. The time/frequency granularities of pre-emption indication may take into account the payload size of the group common DCI carrying the pre-emption indication.

In an example, a UE may be configured to monitor the group common PDCCH for SFI and the group common DCI for DL pre-emption indication within the same or different CORESETs. In an example, the time duration of the reference downlink resource for pre-emption indication may equal to the monitoring periodicity of the group-common DCI carrying the pre-emption indication. In an example, for determination of the frequency region of the reference downlink resource for pre-emption indication, the frequency region of the reference downlink resource may be configured explicitly by RRC. In an example, for determination of the frequency region of the reference downlink resource for pre-emption indication, the frequency region of the reference downlink resource may be implicitly derived by the active DL BWP.

In an example, the minimum periodicity for UE to monitor group common DCI for DL preemption indication may be one slot or less than one slot. In an example, a UE may be configured to monitor group common CSS for at least pre-emption indication on a SCell. In an example, a UE may be configured to monitor SFI in group common PDCCH for a Scell at least on the same SCell, or on a different cell.

In an example embodiment, a wireless device and/or base station may use code block group (CBG)-based transmission with single/multi-bit HARQ-ACK feedback. In an example, a wireless device and/or base station may use CBG based re-transmission for the same TB of a HARQ process. In an example, CBG may include all CBs of a TB regardless of the size of the TB. The UE may report single HARQ ACK bits for the TB. In an example, CBG may include one CB. In an example, CBG granularity may be configurable.

In an example embodiment, a UE may be semi-statically configured by RRC signaling to enable CBG-based retransmission. In an example, the semi-static/RRC configuration to enable CBG-based retransmission may be separate for DL and UL. In an example, for grouping CB(s) into CBG(s), CBGs may be semi-statically configured according to the configured number of CBGs. In an example, for grouping CB(s) into CBG(s), number of CBs per CBG may be configured (e.g., RRC configured). In an example, the number of CBG and the size of CBG may be variable according to the TB size.

In an example embodiment, for grouping CB(s) into CBG(s), with configured number of CBGs, the number of CBs in a CBG may change according to TBS. In an example, with configured number of CBs per CBG, the number of CBGs changes according to TBS. In an example, the number of CBGs and/or the number of CBs per CBG may be defined according to TBS.

In an example embodiment, for downlink data transmission with CBG based (re)transmission, the number of CBG HARQ ACK bits for a TB may be at least equal to the number of CBGs indicated or implied for transmission. In an example, whether or not the UE transmits HARQ ACK bits for CBGs may be indicated or implied e.g., using RRC, MAC, L1 signaling, or may be implicitly derived.

In an example embodiment, for CBG-based (re)transmission, even when the UE is configured with CBG-based transmission, UE may be dynamically informed to report one HARQ-ACK bit for that TB. In an example, for DL CBG-based (re)transmission, following information may be configured to be included in the same DCI: which CBG(s) is/are (re)transmitted, which CBG(s) is/are handled differently for soft-buffer/HARQ combining.

In an example embodiment, pre-emption indication may indicate the UE(s) which DL physical resources has been preempted. In an example, the preemption indication may be transmitted using a PDCCH. In an example, the pre-emption indication may not be included in the DCI that schedules the (re)transmission of the data transmission.

In an example, for grouping CB(s) into CBG(s), with indicated number of CBGs, the number of CBs in a CBG may change according to TBS.

In an example embodiment, for a given number of CBGs for a given TB, the number of CBs per CBG may be as uniform as possible. In an example, the difference of CB number per CBG between any two CBGs may be either 0 or 1. In an example, one TB may be mapped to one DL/UL carrier. In an example, when uplink CBG-based (re)transmission is configured, the UL grant may indicate which CBG(s) of a TB is/are retransmitted In an example embodiment, the number of CBGs per TB may be indicated by RRC signaling. In an example, the number of CBGs per TB may be indicated by L1 signaling. In an example, for semi-static HARQ-ACK codebook determination, TB-level NACK may be used by setting all CBG-level HARQ-ACK bits to NACK. In an example, the number of CBGs per TB may be indicated by RRC signaling. In an example, the number of CBGs per TB may be indicated by L1 signaling. In an example, for initial transmission and retransmission, each CBG of a TB may have the same set of CB(s). In an example, for a UE configured with CBG-based (re)transmission, the same DCI payload size may be assumed for initial transmission and retransmission for the same TB(s).

In an example embodiment, a wireless device may receive one or more messages comprising one or more RRC messages. The one or more messages may comprise configuration parameters for one or more cells. The one or more cells may comprise a primay cell. In an example, the one or more cells may comprise a primary cell and one or more secondary cells. The one or more messages may comprise configuration parameters for a first timer. In an example, the first timer may be a DRX timer. In an example, the first timer may be a drx-RetransmissionTimer. In an example, the wireless device may be further configured/pre-configured with a second timer. The second timer may be a DRX timer. In an example, the second timer may be a HARQ RTT timer. The wireless device may receive, via a physical downlink control channel (PDCCH) or an enhanced PDCCH (EPDCCH), a first downlink control information (DCI). The first DCI may indicate a first plurality of resources for one or more first downlink transport blocks (TBs). The one or more first downlink TBs may correspond to a first service type (e.g., eMBB). The first DCI may comprise one or more fields indicating the first plurality of resources. The first DCI may indicate time domain (e.g., symbol/slot/subframe) and frequency domain (e.g., resource block) resources corresponding to the first plurality of resources. The first DCI may further indicate one or more HARQ related parameter, TTI/numerology for the one or more first downlink TB, parameters for reception/decoding of the one or more first downlink TBs, etc. The wireless device may, in response to receiving the first DCI and/or downlink transmission corresponding to the one or more first downlink TB, start the second timer. The wireless device may, in response to receiving the first DCI and/or downlink transmission corresponding to the one or more first downlink TB, monitor a common control channel. The wireless device may receive, via the common control channel, a group common DCI. The group common DCI may indicate a pre-emption indication.

In an example, the pre-emption indication may indicate that a second plurality of resources are pre-empted. The second plurality of resources may be pre-empted for a URLLC transmission (e.g., in downlink and/or uplink). The pre-emption indication may indicate time domain (e.g., symbol/slot/subframe) and frequency domain (e.g., resource block) resources corresponding to the second plurality of resources. The second plurality of resources may overlap with the first plurality of resources of the one or more first downlink TBs. In an example, HARQ process for the one or more first TBs may be TB-based, e.g., retransmission of the one or more TBs may also be one or more TBs. In an example, the retransmission of the one or more TBs may be CBG-based, e.g., retransmission may be for the CBGs that were not successfully decode. A TB-based retransmission may differ from a CBG-based retransmission. In an example, retransmission of one or more TBs for a TB-based retransmission may also be one or more TBs. In an example, the retransmission of one or more TBs for a CBG based retransmission may be the CBGs of the one or TBs that were not successfully received. In an example, the first DCI may indicate whether the retransmission of the one or more first TBs is TB-based or CBG-based. In an example, the first DCI may comprise a field (e.g., one bit) indicating whether the retransmission of the one or more first TBs is TB-based (e.g., a first value of the one bit) or CBG based (e.g., a second value of the one bit).

Figure 15:
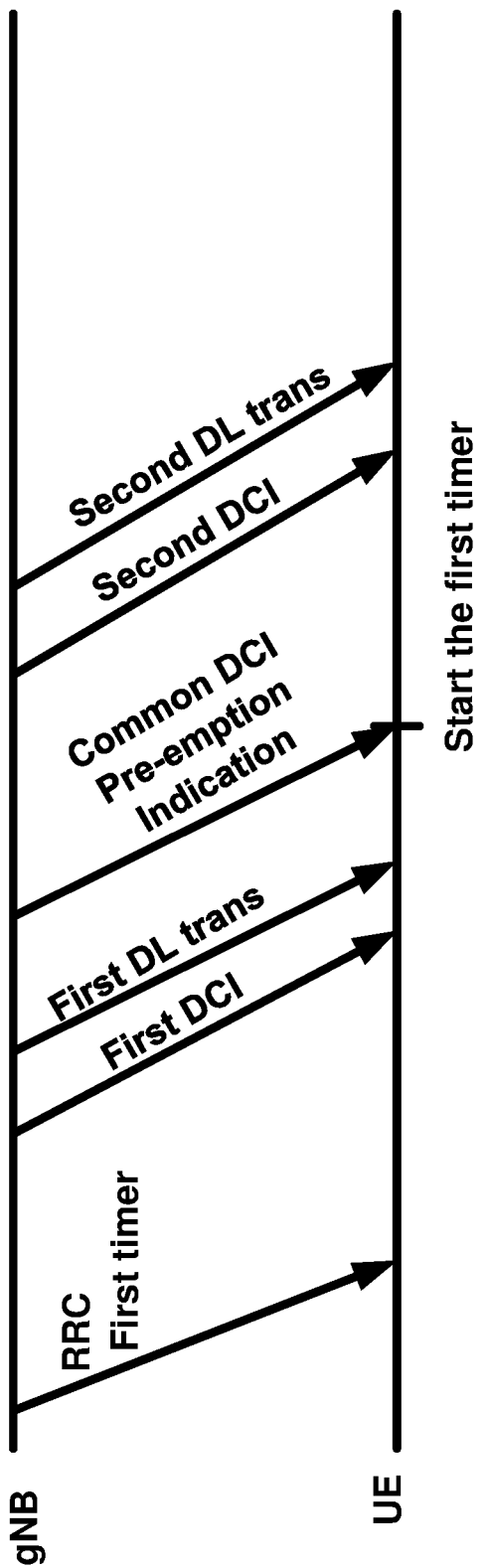
FIG. 15 is an example procedure as per an aspect of an embodiment of the present invention.

In an example embodiment, the wireless device may start the first timer in response to receiving the pre-emption indication. An example procedure is shown in FIG. 15. The wireless device may be in DRX Active state while the first timer is running. The wireless device may monitor a common control channel in response to starting the first timer and/or in response to the wireless device being in DRX Active state. In an example, the wireless device may stop the second timer in response to the starting the first timer and/or in response to receiving the pre-emption indication. In an example, the wireless may not stop the second timer and the second timer and the first timer may be running in parallel. The wireless device may receive a second DCI, via a PDCCH/EPDCCH indicating a third plurality of resources for retransmission of the one or more first downlink TBs. In an example, the second DCI may be for a TB-based retransmission. In an example, the second DCI may be for a CBG-based retransmission. In an example, the second DCI may comprise a field indicating whether the second DCI is for TB-based retransmission or a CBG-based retransmission. The second DCI may further indicate other parameters (e.g., HARQ related parameters, etc.) for receiving the retransmission of the one or more first downlink TBs. The wireless device may retransmit the one or more first downlink TBs employing the third plurality of resources.

In an example embodiment, the wireless device may start the first timer in response to receiving the pre-emption indication and the overlap between the first plurality and the second plurality of resources being above a threshold. In an example, the threshold may be in terms of number of resource elements, number of resource blocks, time domain span of the pre-emption, etc. The threshold may be based on the size of the one or more first downlink TBs and/or the amount of the first plurality of resources. For example, the threshold may be larger for a first size of the one or more first downlink TBs and/or the amount of the first plurality of resources compared to a second size of the one or more first downlink TBs and/or the amount of the first plurality of resources if the first size of the one or more first downlink TBs and/or the amount of the first plurality of resources is larger than the second size of the one or more first downlink TBs and/or the amount of the first plurality of resources. In an example, the threshold may be pre-configured for the wireless device. In an example, the threshold may be configured (e.g., RRC configured) for the wireless device. The wireless device may be in DRX Active state while the first timer is running. The wireless device may monitor a common control channel in response to starting the first timer and/or in response to the wireless device being in DRX Active state. In an example, the wireless device may stop the second timer in response to the starting the first timer and/or in response to receiving the pre-emption indication. In an example, the wireless may not stop the second timer and the second timer and the first timer may be running in parallel. The wireless device may receive a second DCI, via a PDCCH/EPDCCH indicating a third plurality of resources for retransmission of the one or more first downlink TBs. In an example, the second DCI may be for a TB-based retransmission. In an example, the second DCI may be for a CBG-based retransmission. In an example, the second DCI may comprise a field indicating whether the second DCI is for TB-based retransmission or a CBG-based retransmission. The second DCI may further indicate other parameters (e.g., HARQ related parameters, etc.) for receiving the retransmission of the one or more first downlink TBs. The wireless device may retransmit the one or more first downlink TBs employing the third plurality of resources.

In an example embodiment, a wireless device may receive one or more messages comprising one or more RRC messages. The one or more messages may comprise configuration parameters for one or more cells. The one or more cells may comprise a primary cell. In an example, the one or more cells may comprise a primary cell and one or more secondary cells. The one or more messages may comprise configuration parameters for a first timer. In an example, the first timer may be a DRX timer. In an example, the first timer may be a drx-ULRetransmissionTimer. In an example, the wireless device may be further configured/pre-configured with a second timer. The second timer may be a DRX timer. In an example, the second timer may be a UL HARQ RTT timer. The wireless device may receive, via a physical downlink control channel (PDCCH) or an enhanced PDCCH (EPDCCH), a first downlink control information (DCI). The first DCI may indicate a first plurality of resources for one or more first uplink transport blocks (TBs). The one or more first uplink TBs may correspond to a first service type (e.g., eMBB). The first DCI may comprise one or more fields indicating the first plurality of resources. The first DCI may indicate time domain (e.g., symbol/slot/subframe) and frequency domain (e.g., resource block) resources corresponding to the first plurality of resources. The first DCI may further indicate one or more HARQ related parameter, TTI/numerology for the one or more first uplink TBs, one or ore power control related parameters, parameters for reception/decoding of the one or more first uplink TBs, etc. The wireless device may, in response to transmitting the one or more first uplink TBs, start the second timer. The wireless device may, in response to receiving the first DCI monitor a common control channel. The wireless device may receive, via the common control channel, a group common DCI. The group common DCI may indicate a pre-emption indication. In an example, the pre-emption indication may indicate that a second plurality of resources are pre-empted. The second plurality of resources may be pre-empted for a URLLC transmission. The pre-emption indication may indicate time domain (e.g., symbol/slot/subframe) and frequency domain (e.g., resource block) resources corresponding to the second plurality of resources. The second plurality of resources may overlap with the first plurality of resources of the one or more first downlink TBs. In an example, HARQ process for the one or more first TBs may be TB-based, e.g., retransmission of the one or more TBs may also be one or more TBs. In an example, the retransmission of the one or more TBs may be CBG-based, e.g., retransmission may be for the CBGs that were not successfully decode. A TB-based retransmission may differ from a CBG-based retransmission. In an example, retransmission of one or more TBs for a TB-based retransmission may also be one or more TBs. In an example, the retransmission of one or more TBs for a CBG based retransmission may be the CBGs of the one or TBs that were not successfully received. In an example, the first DCI may indicate whether the retransmission of the one or more first TBs is TB-based or CBG-based. In an example, the first DCI may comprise a field (e.g., one bit) indicating whether the retransmission of the one or more first TBs is TB-based (e.g., a first value of the one bit) or CBG based (e.g., a second value of the one bit).

Figure 16:
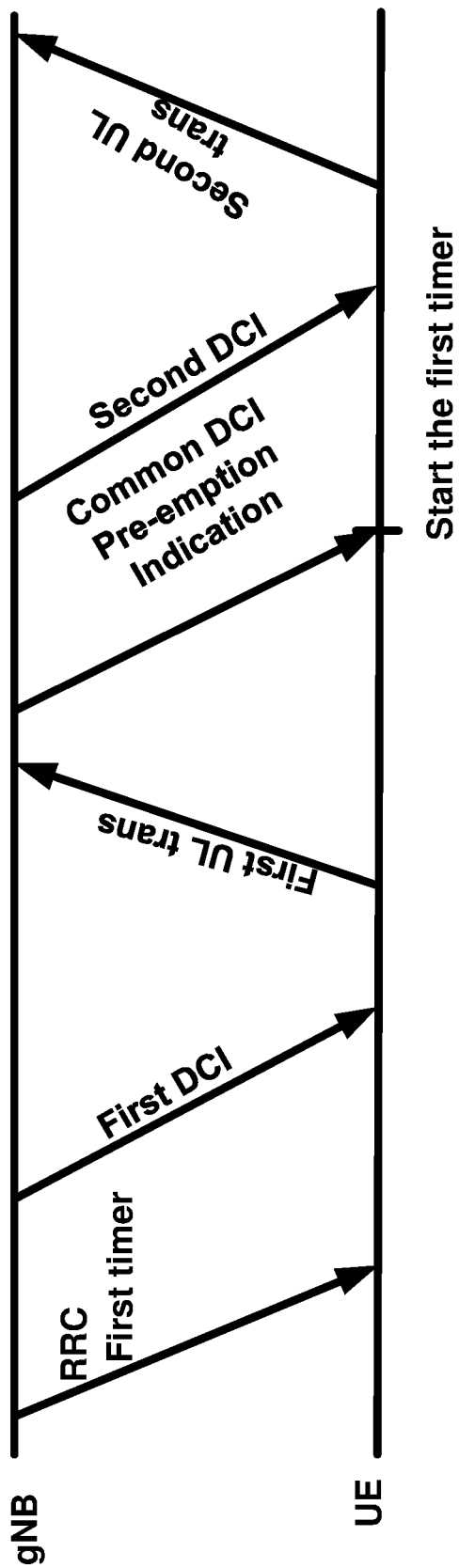
FIG. 16 is an example procedure as per an aspect of an embodiment of the present invention.

In an example embodiment, the wireless device may start the first timer in response to receiving the pre-emption indication. An example procedure is shown in FIG. 16. The wireless device may be in DRX Active state while the first timer is running. The wireless device may monitor a common control channel in response to starting the first timer and/or in response to the wireless device being in DRX Active state. In an example, the wireless device may stop the second timer in response to the starting the first timer and/or in response to receiving the pre-emption indication. In an example, the wireless may not stop the second timer and the second timer and the first timer may be running in parallel. The wireless device may receive a second DCI, via a PDCCH/EPDCCH indicating a third plurality of resources for retransmission of the one or more first uplink TBs. In an example, the second DCI may be for a TB-based retransmission. In an example, the second DCI may be for a CBG-based retransmission. In an example, the second DCI may comprise a field indicating whether the second DCI is for TB-based retransmission or a CBG-based retransmission. The second DCI may further indicate other parameters (e.g., HARQ related parameters, etc.) for retransmission of the one or more first uplink TBs. The wireless device may retransmit the one or more first uplink TBs employing the third plurality of resources.

In an example embodiment, the wireless device may start the first timer in response to receiving the pre-emption indication and the overlap between the first plurality and the second plurality of resources being above a threshold. In an example, the threshold may be in terms of number of resource elements, number of resource blocks, time domain span of the pre-emption, etc. The threshold may be based on the size of the one or more first uplink TBs and/or the amount of the first plurality of resources. For example, the threshold may be larger for a first size of the one or more first uplink TB s and/or the amount of the first plurality of resources compared to a second size of the one or more first uplink TBs and/or the amount of the first plurality of resources if the first size of the one or more first uplink TBs and/or the amount of the first plurality of resources is larger than the second size of the one or more first uplink TB s and/or the amount of the first plurality of resources. In an example, the threshold may be pre-configured for the wireless device. In an example, the threshold may be configured (e.g., RRC configured) for the wireless device. The wireless device may be in DRX Active state while the first timer is running. The wireless device may monitor a common control channel in response to starting the first timer and/or in response to the wireless device being in DRX Active state. In an example, the wireless device may stop the second timer in response to the starting the first timer and/or in response to receiving the pre-emption indication. In an example, the wireless may not stop the second timer and the second timer and the first timer may be running in parallel. The wireless device may receive a second DCI, via a PDCCH/EPDCCH indicating a third plurality of resources for retransmission of the one or more first uplink TBs. In an example, the second DCI may be for a TB-based retransmission. In an example, the second DCI may be for a CBG-based retransmission. In an example, the second DCI may comprise a field indicating whether the second DCI is for TB-based retransmission or a CBG-based retransmission. The second DCI may further indicate other parameters (e.g., HARQ related parameters, etc.) for retransmission of the one or more first uplink TBs. The wireless device may retransmit the one or more first uplink TBs employing the third plurality of resources.

In an example, the timing of a common DCI for indicating pre-emption in downlink and in uplink may be the same and/or may have overlap in time. A wireless device may expect either pre-emption indication corresponding to an uplink transmission or pre-emption indication corresponding to a downlink transmission. In an example embodiment, the signaling for pre-emption indication corresponding to uplink transmission and pre-emption indication corresponding to a downlink transmission may be unified, for example using a common RNTI and/or DCI format.

Figure 17:
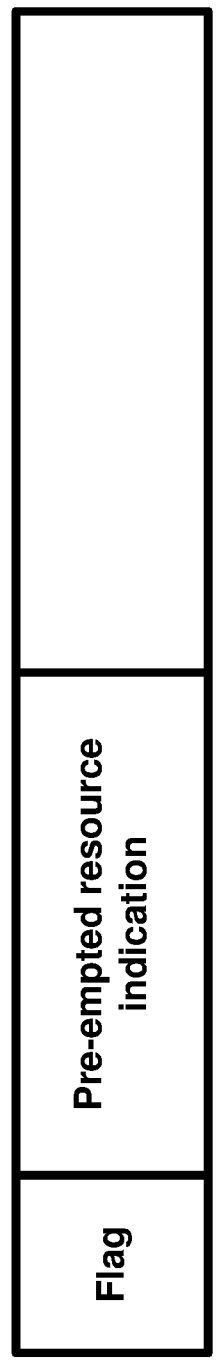
FIG. 17 is an example group common DCI as per an aspect of an embodiment of the present invention.

In an example embodiment, a wireless device may receive one or more messages comprising one or more RRC messages. The one or more RRC messages may comprise configuration parameters for one or more cells. The one or more cells may comprise a primary cell. In an example, the one or more cells may comprise a primary cell and one or more secondary cells. The one or more RRC messages may comprise a first RNTI. The first RNTI may correspond to pre-emption indication (e.g., corresponding to uplink and/or downlink transmission). The wireless device may receive a first DCI via a PDCCH/EPDCCH. The first DCI may indicate a first plurality of resources for a first uplink transmission of one or more first uplink transport blocks (TBs). The one or more first uplink TBs may correspond to a first service type (e.g., eMBB). The first DCI may comprise one or more fields indicating the first plurality of resources. The first DCI may indicate time domain (e.g., symbol/slot/subframe) and frequency domain (e.g., resource block) resources corresponding to the first plurality of resources. The first DCI may further indicate HARQ related parameters, power control related parameters, TTI/numerology for the one or more first uplink TBs, other parameters for transmission of the one or more first uplink TBs, etc. The wireless device may monitor a common control channel. In an example, the wireless device may monitor the common control channel in response to transmitting the one or more first uplink TBs. The wireless device may receive a group common DCI via the common control channel. The group common DCI may indicate a pre-emption indication. The CRC corresponding to the group common DCI may be scrambled with the first RNTI. In an example, the group common DCI may be of a first format. The first format may be pre-configured for the group common DCI (e.g., group common DCI used for pre-emption indication). In an example, the first format may be pre-configured for the group common DCI indicating the pre-emption indication corresponding to downlink and uplink transmission. In an example, the group common DCI may comprise a field (e.g., a flag field) indicating whether the group common DCI comprises a pre-emption indication corresponding to an uplink transmission or a downlink transmission. An example group common DCI with a flag field is shown in FIG. 17. DCI In an example, the field may comprise one bit. For example, a first value (e.g., zero) for the field may indicate that the common DCI indicates preemption indication corresponding to an uplink transmission. For example, a second value (e.g., one) for the field may indicate that the group common DCI indicates preemption indication corresponding to a downlink transmission. The pre-emption indication may indicate that a second plurality of resources are pre-empted. In an example, the second plurality of resources may be pre-empted for a URLLC transmission. The pre-emption indication may indicate time domain (e.g., symbol/slot/subframe) and frequency domain (e.g., resource block) resources corresponding to the second plurality of resources. In an example, the second plurality of resources may have overlap with the first plurality of resources. The wireless device may perform the first uplink transmission wherein the overlapping resources of the first plurality of resources and the second plurality of resources may be punctured from the first the first plurality of resources when the wireless device performs the first uplink transmission of the one or more first uplink TBs.

In an example embodiment, a wireless device may receive one or more messages comprising one or more RRC messages. The one or more RRC messages may comprise configuration parameters for one or more cells. The one or more cells may comprise a primary cell. In an example, the one or more cells may comprise a primary cell and one or more secondary cells. The one or more RRC messages may comprise a first RNTI. The first RNTI may correspond to pre-emption indication (e.g., corresponding to uplink and/or downlink transmission). The wireless device may receive a first DCI via a PDCCH/EPDCCH. The first DCI may indicate a first plurality of resources for one or more first downlink transport blocks (TBs). The one or more first downlink TBs may correspond to a service type (e.g., eMBB). The first DCI may comprise one or more fields indicating the first plurality of resources. The first DCI may indicate time domain (e.g., symbol/slot/subframe) and frequency domain (e.g., resource block) resources corresponding to the first plurality of resources. The first DCI may further indicate HARQ related parameters, TTI/numerology for the one or more first downlink TBs, other parameters for reception/decoding of the one or more first downlink TBs, etc. The wireless device may monitor a common control channel. In an example, the wireless device may monitor the common control channel in response to receiving the first DCI and/or receiving the one or more first downlink TBs. The CRC corresponding to the group common DCI may be scrambled with the first RNTI. The first RNTI may be used for both pre-emption indication corresponding to uplink transmission and pre-emption indication corresponding to downlink transmission. In an example, the group common DCI may be of a first format. The first format may be pre-configured for the group common DCI (e.g., group common DCI used for pre-emption indication). In an example, the first format may be pre-configured for the group common DCI indicating the pre-emption indication corresponding to downlink and uplink transmission. In an example, the first format may be common for pre-emption indication corresponding to uplink and downlink. The first format may be pre-configured for the group common DCI (e.g., group common DCI used for pre-emption indication).

In an example, the group common DCI may comprise a field (e.g., a flag field) indicating whether the group common DCI comprises a pre-emption indication corresponding to an uplink transmission or a downlink transmission. An example group common DCI with a flag field is shown in FIG. 17. In an example, the field may comprise one bit. For example, a first value (e.g., zero) for the field may indicate that the common DCI indicates preemption indication corresponding to an uplink transmission. For example, a second value (e.g., one) for the field may indicate that the group common DCI indicates preemption indication corresponding to a downlink transmission. The pre-emption indication may indicate that a second plurality of resources are pre-empted. In an example, the second plurality of resources may be pre-empted for a URLLC transmission. The pre-emption indication may indicate time domain (e.g., symbol/slot/subframe) and frequency domain (e.g., resource block) resources corresponding to the second plurality of resources. In an example, the second plurality of resources may have overlap with the first plurality of resources. In an example, the wireless device may employ the pre-emption indication in decoding the one or more first downlink TBs.

In an example embodiment, a group common DCI may indicate uplink grants for one or more UEs. In an example, a UE in the one or more UEs may be configured (e.g., with RRC) with one or more indexes. In an example, the group common DCI may comprise/indicate one or more uplink grants for the one or more UEs and a UE in the one or more UEs may identify an uplink grant in the one or more uplink grants based on the one or more indexes corresponding to the UE. In an example, the one or more UEs may be scheduled for URLLC data using the group common DCI. In an example, the group common DCI comprising/indicating the one or more uplink grants may comprise/indicate UE IDs associated with the one or more UEs. In an example, a UE in the one or UEs may identify an uplink in the one or more uplink grants based its UE ID. In an example, the group common DCI comprising/indicating the one or more uplink grants may be same group common DCI used for pre-emption indication. In an example, the group common DCI may comprise pre-emption indication and the one or more uplink grants for the one or more UEs. In an example, the group common DCI comprising the one or more uplink grants may be different from the group common DCI indicating the pre-emption indication. In an example, the one or more UEs may monitor a common control channel for the group common DCI comprising/indicating the one or more uplink grants at pre-defined times. In an example, the one or more UEs monitoring the common control channel for the group common DCI comprising/indicating the one or more uplink grants may be UEs configured with the one or more indexes and/or UE IDs for identifying their corresponding uplink grants.

In an example embodiment, a wireless device may receive one or more messages comprising one or more RRC messages. The one or more RRC messages may comprise configuration parameters for one or more cells. The one or more cells may comprise a primary cell. In an example, the one or more cells may comprise a primary cell and one or more secondary cells. The one or more RRC messages may comprise a first RNTI. The first RNTI may correspond to pre-emption indication. The wireless device may receive a first DCI via a PDCCH/EPDCCH. The first DCI may indicate a first plurality of resources for a first uplink transmission of one or more first uplink transport blocks (TBs). The one or more uplink TBs may correspond to a first service type (e.g., eMBB). The first DCI may comprise one or more fields indicating the first plurality of resources. The first DCI may indicate time domain (e.g., symbol/slot/subframe) and frequency domain (e.g., resource block) resources corresponding to the first plurality of resources. The first DCI may further indicate HARQ related parameters, power control related parameters, TTI/numerology for the one or more first uplink TBs, other parameters for transmission of the one or more first uplink TBs, etc. The wireless device may monitor a common control channel. In an example, the wireless device may monitor the common control channel in response to transmitting the one or more first uplink TBs. The wireless device may receive a group common DCI via the common control channel. The group common DCI may indicate a pre-emption/suspension indication. The CRC corresponding to the group common DCI may be scrambled with the first RNTI. The pre-emption/suspension indication may indicate that a second plurality of resources are pre-empted. In an example, the second plurality of resources may be pre-empted for a URLLC transmission. The pre-emption indication may indicate time domain (e.g., symbol/slot/subframe) and frequency domain (e.g., resource block) resources corresponding to the second plurality of resources. In an example, the second plurality of resources may have overlap with the first plurality of resources. The wireless device may suspend the first uplink transmission of the one or more first uplink TBs in response to receiving the pre-emption indication. In an example, if the wireless device started transmission of the one or more TBs when the wireless device receives the pre-emption/suspension indication, the wireless device may stop the transmission of the one or more TBs. In an example, if the wireless device has not started transmission of the one or more TBs when the wireless device receives the pre-emption/suspension indication, the wireless device may not transmit the one or more TBs. In an example embodiment, in response to suspending the transmission of the one or more TBs, the wireless device may flush the corresponding HARQ buffer and ignore the one or more TBs. The corresponding HARQ process may be free for base station scheduling. In an example, embodiment, the wireless device may keep the TBs in the corresponding HARQ buffer and the base station may schedule the wireless for retransmission of the one or more TBs. The base station may transmit a DCI with the same HARQ process corresponding to the one or more TBs and schedule retransmission of the one or more TBs (e.g., with a new redundancy version).

Figure 18:
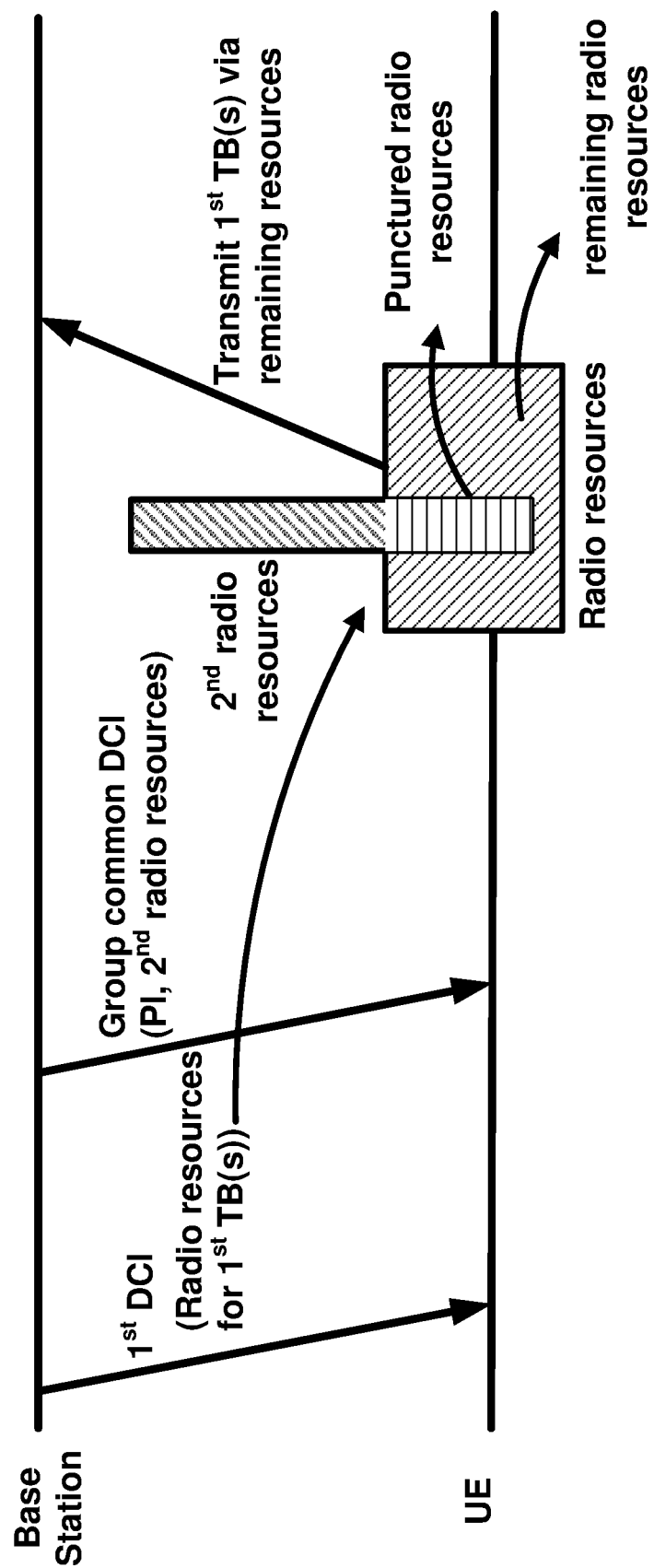
FIG. 18 is an example pre-emption indication as per an aspect of an embodiment of the present invention.

In an example embodiment as shown in FIG. 18, a wireless device may receive one or more messages comprising configuration parameters. In an example, the one or more messages may comprise pre-emption indication configuration parameters. In an example, the pre-emption indication configuration parameters may indicate time domain and frequency domain regions for downlink and/or uplink pre-emption indication. In an example, the pre-emption indication configuration parameters may comprise a pre-emption indication RNTI. The wireless device may monitor the control channel for a DCI addressed to the pre-emption indication RNTI.

In an example, the wireless device may receive a first DCI. The first DCI may comprise an uplink grant. The uplink grant may comprise transmission parameters for one or more uplink transport blocks. The transmission parameters may comprise radio resources for transmission of the one or more transport block, HARQ related parameters (e.g., HARQ ID, NDI, RV, etc.), power control related parameters, etc. In an example the DCI/uplink grant may indicate a first plurality of resource for transmission of the one or more transport blocks.

In an example the wireless device may receive a second DCI. The second DCI may be a group-common DCI. The wireless device may receive the DCI in a common control channel. The DCI may comprise a field indicating an uplink pre-emption indication. The field in the DCI may be used to indicate whether the DCI is for an uplink pre-emption indication or a downlink pre-emption indication. In an example, a first value of the field may indicate that the DCI is for downlink pre-emption and a second value of the field may indicate that the DCI is for uplink pre-emption indication. In an example, the second DCI (e.g., the group-common DCI) may have a first format. In an example, the first format DCI may be used for uplink and downlink pre-emption indication. In an example, the uplink pre-emption indication may indicate a second plurality of resources. In an example, the second DCI may correspond to the pre-emption indication radio network temporary identifier. In an example, the pre-emption indication temporary network identifier may be used for downlink or uplink pre-emption indication. The wireless device and/or other wireless devices (e.g., wireless devices configured with the pre-emption indication RNTI), by receiving the uplink pre-emption indication determine that it/they can not use the second plurality of resources for its/their transmission(s). In an example, the second plurality of resources may indicate time domain and frequency domain resources. In an example, the time domain and frequency domain resources may be indicated by the second DCI and the pre-emption indication configuration parameters jointly. In an example, the second DCI may indicate one or more time domain and frequency domain resources configured by RRC. In an example, the pre-emption indication configuration parameters may indicate a plurality of frequency domain and time domain regions and the second plurality of resources may be based on the one or more first frequency regions and one or more first time domain regions (e.g., of the plurality of frequency domain and time domain regions). In an example the second plurality of resources may be used for transmission of data of a first type. In an example, the data of the first type may be ultra-reliable low-latency communications (URLLC) data. In an example, the data of the first type may be transmitted by one or more other wireless devices.

In an example, the wireless device may puncture one or more first resources from the first plurality of resources (e.g., resources indicated by the first DCI). In an example, the one or more first resources may be overlapping resources of the first plurality of resources and the second plurality of resources. The wireless device may transmit the one or more uplink transport blocks via remaining resources of the first plurality of resources after puncturing.

Figure 19:
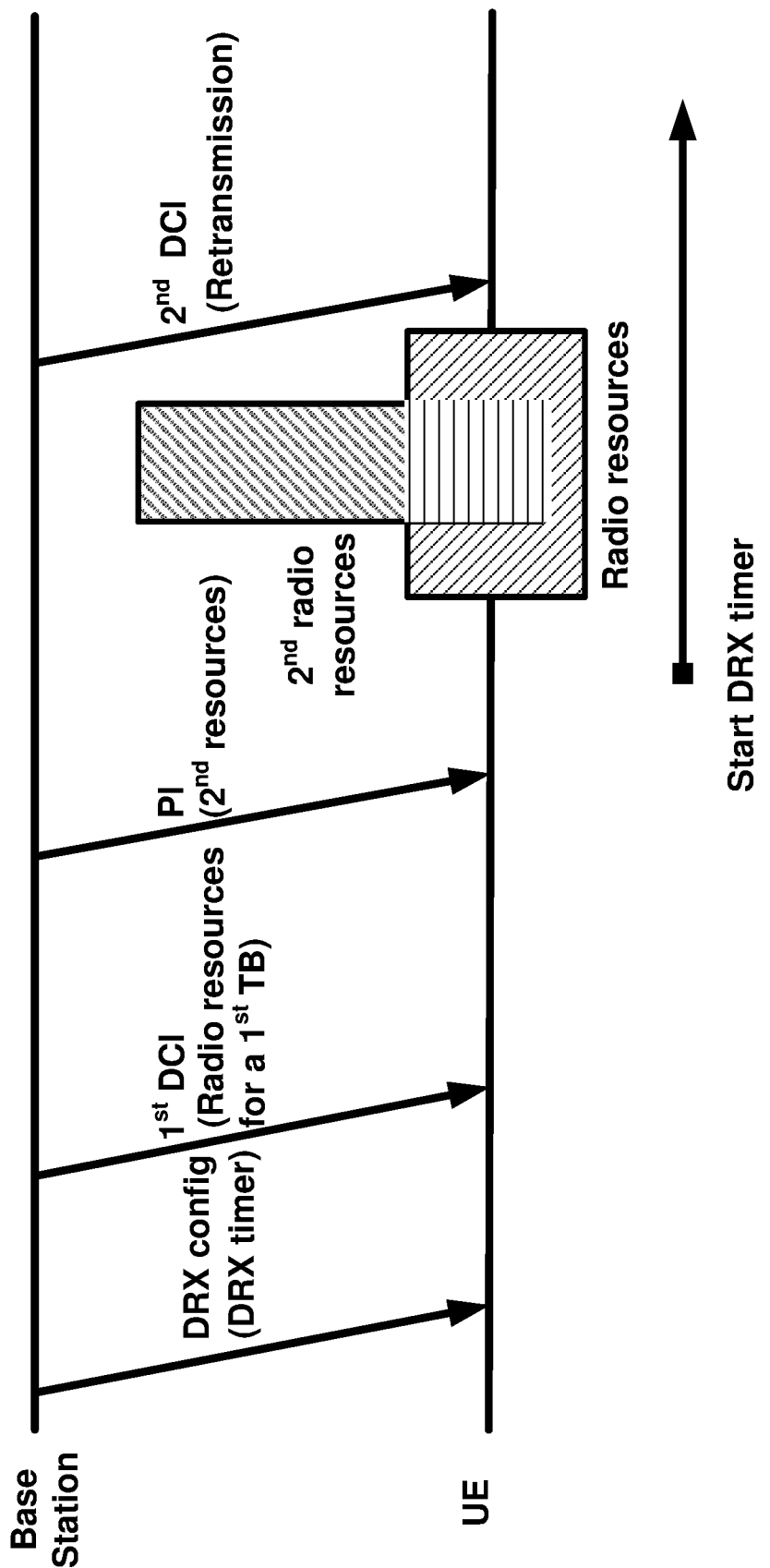
FIG. 19 is an example procedure as per an aspect of an embodiment of the present invention.

In an example embodiment as shown in FIG. 19, a wireless device may receive one or more messages comprise configuration parameters. The one or more messages may comprise discontinuous reception configuration parameters. In an example, the one or more messages may comprise discontinuous reception configuration parameters for a discontinuous reception retransmission timer. In an example, the one or more message may comprise pre-emption indication configuration parameters. The pre-emption indication configuration parameters may indicate time domain and frequency domain regions for pre-emption indication. The pre-emption indication configuration parameters may indicate a radio network temporary identifier. A DCI may be used for pre-emption indication. The DCI may indicate the resources to be pre-empted.

In an example, the wireless device may receive a first downlink control information indicating transmission parameters for a first transport block. In an example, the transmission parameters may comprise a first plurality of resources for a first transport block. In an example, the transmission parameters may comprise HARQ related parameters (e.g., HARQ ID, NDI, RV, etc.), power control parameters, etc.

In an example, the wireless device may receive a pre-emption indication indicating that a second plurality of resources are pre-empted. In an example, the wireless device may receive a downlink control information indicating the pre-emption indication. In an example, the wireless device may start the discontinuous reception timer based on the receiving the pre-emption indication. In an example, the starting the discontinuous reception timer may be in response to the receiving the pre-emption indication. In an example, the starting the discontinuous reception timer may be in response to the receiving the pre-emption indication and one or more third radio resources being larger than a first value. The second plurality of radio resources may overlap with the first plurality of resources in the one or more third radio resources. In an example, the first value may be based on a first number of time domain resources. In an example, the first value may be based on a second number of frequency domain resources. In an example, the first value may be based on a first number of time domain resources and a second number of frequency domain resources. In an example, the one or more messages may indicate the first value and/or the first number and/or the second number. In an example, the first value may be based on a first plurality of radio resources.

In an example, the wireless device may monitor a control channel in response to the discontinuous reception timer running. In an example, the wireless device may receive a second downlink control information indicating retransmission of one or more data blocks. In an example, the one or more data blocks may comprise one or more code block groups of the first transport block. In an example, the one or more data blocks may comprise the first transport block.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 19 is an example flow diagram as per an aspect of an embodiment of the present disclosure. At 1910, a wireless device may receive a first downlink control information (DCI). The first DCI may indicate a first plurality of resources for one or more uplink transport blocks. At 1920, a group common DCI may be received via a common control channel. The group common DCI may comprise a field indicating an uplink pre-emption indication. The uplink pre-emption indication may indicate a second plurality resources. At 1930, one or more first resources may be punctured from the first plurality of resources. The one or more first resources may be overlapping resources of the first plurality of resources and the second plurality of resources. At 1940, the one or more uplink transport blocks may be transmitted via remaining resources of the first plurality of resources after the puncturing.

According to an example embodiment, the field may indicate a first value indicating that the group common DCI corresponds to an uplink pre-emption indication. According to an example embodiment, the first DCI may indicate transmission parameters of the one or more uplink transport blocks. According to an example embodiment, the second plurality of resources may be employed for an ultra-reliable low-latency communication service. According to an example embodiment, the group common DCI may employ a first DCI format; the first DCI format may be used for downlink pre-emption indication or uplink pre-emption indication; and a first value of the first field may indicate whether the common DCI is for downlink pre-emption indication or uplink pre-emption indication. According to an example embodiment, the second plurality of resources may indicate time-domain and frequency-domain resources. According to an example embodiment, the wireless device may receive pre-emption indication configuration parameters comprising a radio network temporary identifier. According to an example embodiment, the second plurality of resources may indicate time-domain and frequency-domain resources.

According to an example embodiment, the wireless device may receive pre-emption indication configuration parameters comprising a radio network temporary identifier. According to an example embodiment, the pre-emption indication configuration parameters may indicate a plurality of frequency regions and time regions; and the second plurality of resources may be based on one or more first frequency regions and one or more first time regions. According to an example embodiment, the group common DCI may correspond to the radio network temporary identifier. According to an example embodiment, the radio network temporary identifier may be employed by downlink pre-emption indication and uplink pre-emption indication. According to an example embodiment, the common control channel may be monitored for the radio network temporary identifier. According to an example embodiment, the first DCI may indicate transmission parameters of the one or more uplink transport blocks. According to an example embodiment, the second plurality of resources may be employed for an ultra-reliable low-latency communication service. According to an example embodiment, the second plurality of resources may be employed for an ultra-reliable low-latency communication service. According to an example embodiment, the pre-emption indication configuration parameters may indicate a plurality of frequency regions and time regions; and the second plurality of resources may be based on one or more first frequency regions and one or more first time regions. According to an example embodiment, the group common DCI may correspond to the radio network temporary identifier. According to an example embodiment, the radio network temporary identifier may be employed by downlink pre-emption indication and uplink pre-emption indication. According to an example embodiment, the common control channel may be monitored for the radio network temporary identifier.

Figure 20:
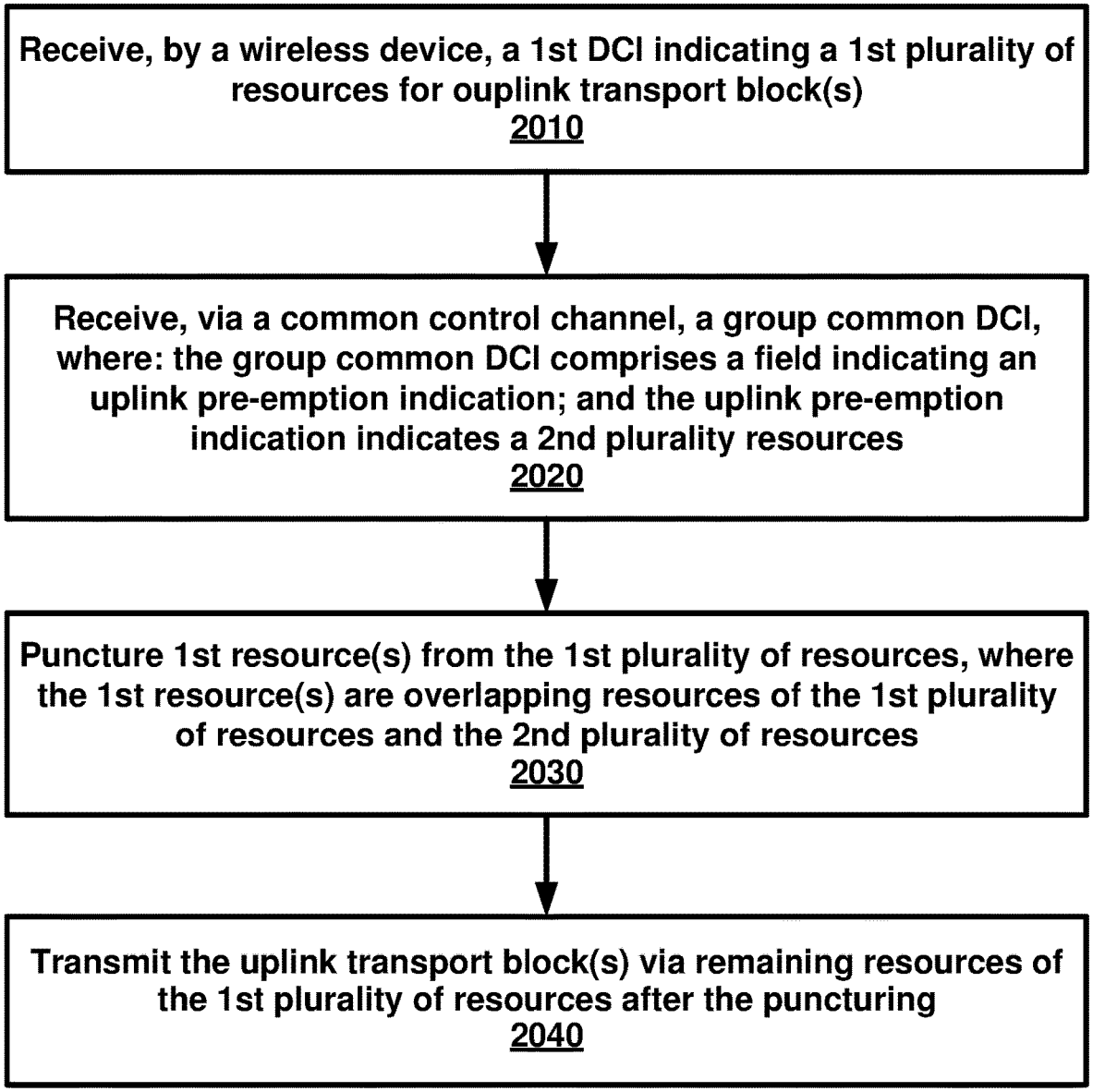
FIG. 20 is a flow diagram of an aspect of an embodiment of the present disclosure.
Figure 21:
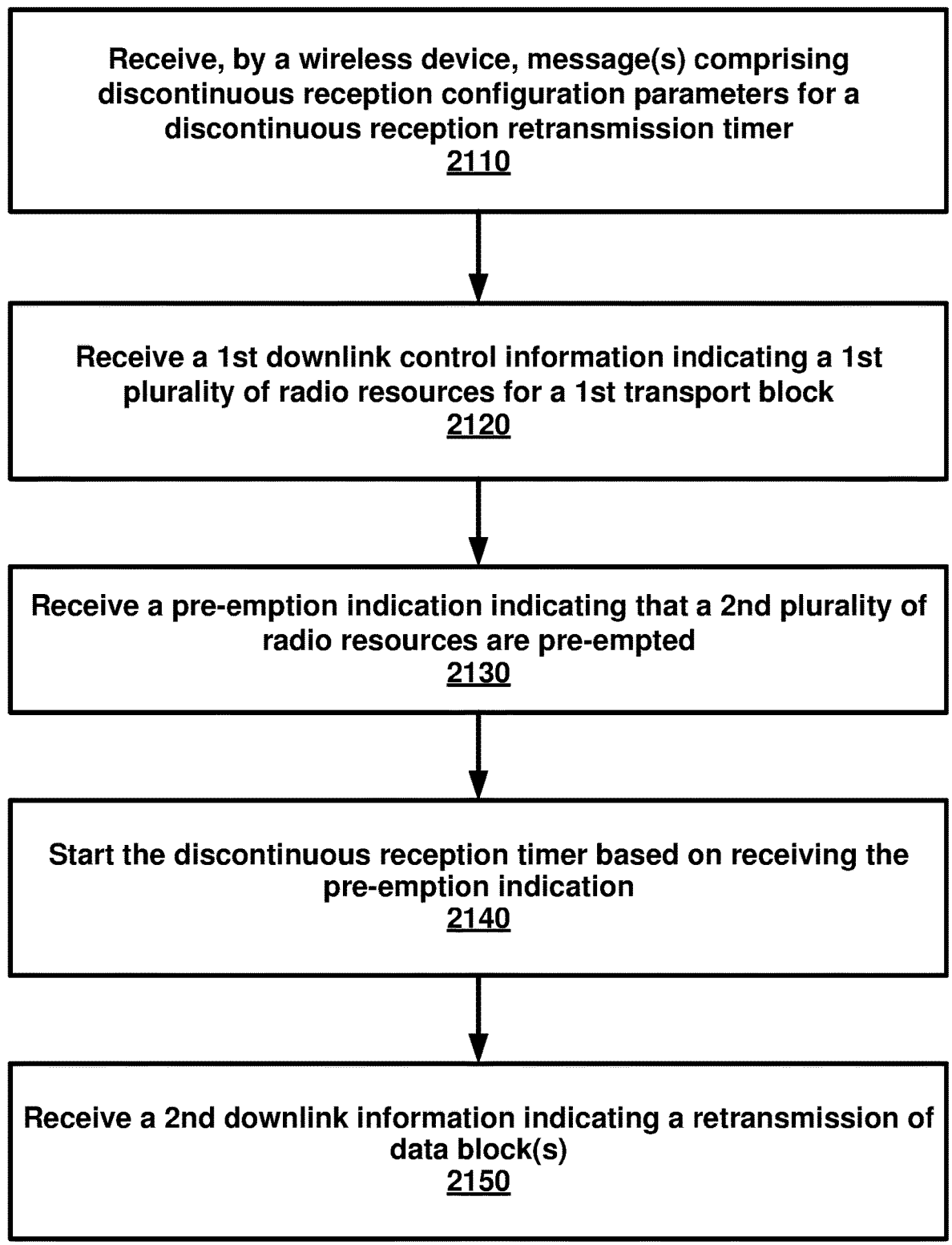
FIG. 21 is a flow diagram of an aspect of an embodiment of the present disclosure.

FIG. 20 is an example flow diagram as per an aspect of an embodiment of the present disclosure. At 2010, a wireless device may receive one or more messages. The one or more messages may comprise discontinuous reception configuration parameters for a discontinuous reception retransmission timer. At 2020, a first downlink control information may be received. The first downlink control information may indicate a first plurality of radio resources for a first transport block. At 2030, a pre-emption indication may be received. The pre-emption indication may indicate that a second plurality of radio resources are pre-empted. At 2040, the discontinuous reception timer may be started based on the receiving the pre-emption indication. At 2050, a second downlink information may be received. second downlink information may indicate a retransmission of one or more data blocks.

According to an example embodiment, the starting the discontinuous reception may be in response to the receiving the pre-emption indication. According to an example embodiment, the starting the discontinuous reception may be in response to: the receiving the pre-emption indication; and one or more third radio resources being larger than a first value. The second plurality of radio resources may overlap with the first plurality of resources in the one or more third radio resources. According to an example embodiment, the first value may be based a first number of time domain resources. According to an example embodiment, the first value may be based on a second number of frequency domain resources. According to an example embodiment, the first value may be based on a first number of time domain resources and a second number of frequency domain resources. According to an example embodiment, the first value may be based on the first plurality of radio resources. According to an example embodiment, the one or more messages may indicate the first value. According to an example embodiment, a control channel may be monitored in response to the discontinuous reception timer running. According to an example embodiment, the one or more data blocks may comprise one or more code block groups of the first transport block. According to an example embodiment, the one or more data blocks may comprise the first transport block.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, a first downlink control information (DCI) indicating a first plurality of resources for one or more uplink transport blocks;
   receiving, via a common control channel, a group common DCI, wherein:
   the group common DCI employs a first DCI format used for a pre-emption indication;
   the group common DCI comprises a field indicating whether the group common DCI is for a downlink pre-emption indication or an uplink pre-emption indication, and a value of the field indicates the uplink pre-emption indication; and
   the uplink pre-emption indication indicates a second plurality of resources;
   starting a discontinuous reception timer based on the pre-emption indication;
   puncturing one or more first resources from the first plurality of resources, wherein the one or more first resources are overlapping resources of the first plurality of resources and the second plurality of resources; and
   transmitting the one or more uplink transport blocks via remaining resources of the first plurality of resources after the puncturing;
   receiving, while the discontinuous reception timer is running, a second DCI indicating retransmission of the one or more uplink transport blocks; and
   retransmitting, by the wireless device, the one or more uplink transport blocks.

2. The method of claim 1, wherein the field indicates a first value indicating that the group common DCI corresponds to an uplink pre-emption indication.

3. The method of claim 2, wherein the first DCI indicates transmission parameters of the one or more uplink transport blocks.

4. The method of claim 2, wherein the second plurality of resources are employed for an ultra-reliable low-latency communication service.

5. The method of claim 1, wherein: the first DCI format indicates that the group common DCI is to indicate pre-emption.

6. The method of claim 5, wherein the second plurality of resources indicate time-domain and frequency-domain resources.

7. The method of claim 5, further comprising receiving, by the wireless device, pre-emption indication configuration parameters comprising a radio network temporary identifier.

8. The method of claim 1, wherein the second plurality of resources indicate time-domain and frequency-domain resources.

9. The method of claim 1, further comprising receiving, by the wireless device, pre-emption indication configuration parameters comprising a radio network temporary identifier.

10. The method of claim 9, wherein:
    the pre-emption indication configuration parameters indicate a plurality of frequency regions and time regions; and
    the second plurality of resources are based on one or more first frequency regions and one or more first time regions.

11. The method of claim 9, wherein the group common DCI corresponds to the radio network temporary identifier.

12. The method of claim 9, wherein the radio network temporary identifier is employed by downlink pre-emption indication and uplink pre-emption indication.

13. The method of claim 9, further comprising monitoring the common control channel for the radio network temporary identifier.

14. The method of claim 9, wherein the second plurality of resources are employed for an ultra-reliable low-latency communication service.

15. The method of claim 14, wherein:
    the pre-emption indication configuration parameters indicate a plurality of frequency regions and time regions; and
    the second plurality of resources are based on one or more first frequency regions and one or more first time regions.

16. The method of claim 14, wherein the group common DCI corresponds to the radio network temporary identifier.

17. The method of claim 14, wherein the radio network temporary identifier is employed by downlink pre-emption indication and uplink pre-emption indication.

18. The method of claim 14, further comprising monitoring the common control channel for the radio network temporary identifier.

19. The method of claim 1, wherein the first DCI indicates transmission parameters of the one or more uplink transport blocks.

20. The method of claim 19, wherein the second plurality of resources are employed for an ultra-reliable low-latency communication service.